(12) United States Patent
Yasugi et al.

(10) Patent No.: US 11,652,991 B2
(45) Date of Patent: May 16, 2023

(54) VIDEO DECODING APPARATUS WITH PICTURE TILE STRUCTURE

(71) Applicants: Sharp Kabushiki Kaisha, Sakai (JP); FG Innovation Company Limited, Tuen Mun (HK)

(72) Inventors: Yukinobu Yasugi, Sakai (JP); Tomohiro Ikai, Sakai (JP); Tomoko Aono, Sakai (JP)

(73) Assignees: SHARP KABUSHIKI KAISHA, Sakai (JP); FG Innovation Company Limited, New Territories (HK)

( * ) Notice: Subject to any disclaimer, the term of this patent is extended or adjusted under 35 U.S.C. 154(b) by 173 days.

(21) Appl. No.: 17/256,617

(22) PCT Filed: Jun. 24, 2019

(86) PCT No.: PCT/JP2019/025010
§ 371 (c)(1),
(2) Date: Dec. 28, 2020

(87) PCT Pub. No.: WO2020/004349
PCT Pub. Date: Jan. 2, 2020

(65) Prior Publication Data
US 2021/0266540 A1      Aug. 26, 2021

(30) Foreign Application Priority Data

Jun. 29, 2018   (JP) .............................. JP2018-124640
Oct. 5, 2018    (JP) .............................. JP2018-189948
Oct. 10, 2018   (JP) .............................. JP2018-191532

(51) Int. Cl.
*H04N 19/119*      (2014.01)
*H04N 19/172*      (2014.01)
(Continued)

(52) U.S. Cl.
CPC ......... *H04N 19/119* (2014.11); *H04N 19/172* (2014.11); *H04N 19/70* (2014.11); *H04N 19/96* (2014.11)

(58) Field of Classification Search
None
See application file for complete search history.

(56) References Cited

U.S. PATENT DOCUMENTS

2013/0343460 A1*  12/2013   Itani .................... H04N 19/55
                                                       375/240.16
2014/0247876 A1    9/2014   Moriya et al.

FOREIGN PATENT DOCUMENTS

WO        2013065402 A1     5/2013

OTHER PUBLICATIONS

"Series H: Audiovisual and Multimedia Systems, Infrastructure of audiovisual services—Coding of moving video, High efficiency video coding," Recommendation ITU-T H.265, Dec. 2016, 664 pages, ITU Telecommunication Standardization Sector of ITU, Geneva, Switzerland (Year: 2016).*

(Continued)

Primary Examiner — Stuart D Bennett
(74) Attorney, Agent, or Firm — ScienBiziP, P.C.

(57) ABSTRACT

A video decoding apparatus (31) for splitting an image into tiles, splits a tile of the tiles into coding tree units (CTUs), and decodes a video on a per-CTU basis, the video decoding apparatus including a header decoder (3020) configured to decode tile unit information indicating a unit for a size of a tile from header information of a coding stream, and a coding tree (CT) decoder (3021) configured to split the tile into CTUs, wherein the header decoder derives a tile upper left position and a tile size by using the tile unit information.

18 Claims, 19 Drawing Sheets

(51) Int. Cl.
*H04N 19/70* (2014.01)
*H04N 19/96* (2014.01)

(56) References Cited

OTHER PUBLICATIONS

Author Unknown, "Series H: Audiovisual and Multimedia Systems, Infrastructure of audiovisual services—Coding of moving video, High efficiency video coding," Recommendation ITU-T H.265, Dec. 2016, 664 pages, ITU Telecommunication Standardization Sector of ITU, Geneva, Switzerland.
Chen, Jianle, et al., "Algorithm Description of Joint Exploration Test Model 7 (JEM 7)," JVET-G1001-v1, JVET of ITU-T SG 16 WP 3 and ISO/IEC JTC 1/SC 29/WG 11, 7th Meeting, Jul. 13-21, 2017, 50 pages, Torino, IT.
PCT International Search Report and Written Opinion of Commonly Owned International Patent Application PCT/JP2019/025010, dated Sep. 17, 2019, 8 pages, International Searching Authority (JPO).
Sjöberg, Rickard, et al., "Flexible Tiles," JVET-K0260_v1, JVET of ITU-T SG 16 WP 3 and ISO/IEC Jtc 1/SC 29/WG 11, 11th Meeting, Jul. 10-18, 2018, 7 pages, Ljubljana, SI.
Sugimoto, Kazuo, et al., "New definition for Tile/slice boundary," JCTVC-G453, JCT-VC of ITU-T SG 16 WP3 and ISO/IEC JTC 1/SC 29/WG 11, 7th Meeting, Nov. 21-30, 2011, 5 pages, Geneva, CH.
Yasugi, Yukinobu, et al., "AHG12: Flexible Tile Splitting," JVET-L0359_r4; JVET-L0359 text, JVET of ITU-T SG 16 WP 3 and ISO/IEC JTC 1/SC 29/WG 11, 12th Meeting, Oct. 3-12, 2018, 17 pages, Macao, CN.
Yasugi, Yukinobu, et al., "AHG12: Flexible Tile Partitioning," JVET-K0155-v1, JVET of ITU-T SG1 6 WP 3 and ISO/IEC JTC 1/SC 29/WG 11, 11th Meeting, Jul. 10-18, 2018, 7 pages, Ljubljana, SI.
International Telecommunication Union, "Series H: Audiovisual and Multimedia Systems Infrastructure of audiovisual services—Coding of moving video", ITU-T H.264, (Apr. 2017).

* cited by examiner (a)     (b)     (c)     (d)
QT     BT (VERTICALLY SPLIT)    BT (HORIZONTALLY SPLIT)
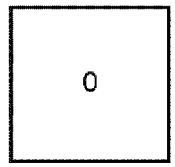 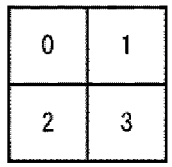 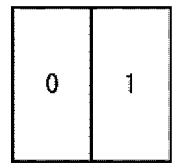 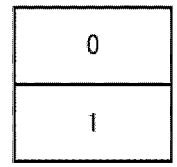
(e)     (f)
TT (VERTICALLY SPLIT)    TT (HORIZONTALLY SPLIT)
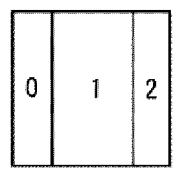 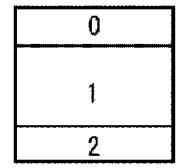
FIG. 2

(a)

| seq_parameter_set_rbsp( ) { | Descriptor |
|---|---|
| sps_video_parameter_set_id | u(4) |
| ... | |
| sps_seq_parameter_set_id | ue(v) |
| ... | |
| pic_width_in_luma_samples | ue(v) |
| pic_height_in_luma_samples | ue(v) |
| ... | |
| independent_tiles_flag | u(1) |
| vui_parameters_present_flag | u(1) |
| if( vui_parameters_present_flag ) | |
|    vui_parameters( ) | |
| ... | |

(b)

| pic_parameter_set_rbsp( ) { | Descriptor |
|---|---|
| pps_pic_parameter_set_id | ue(v) |
| pps_seq_parameter_set_id | ue(v) |
| ... | |
| entropy_coding_sync_enabled_flag | u(1) |
| tile_parameters( ) | u(1) |
| ... | |

(c)

| tile_parameters() { | Descriptor |
|---|---|
| tiles_enabled_flag | u(1) |
| if ( tiles_enabled_flag ) { | |
|   tile_info() | |
|   independent_tiles_flag | u(1) |
|   if ( !independent_tiles_flag ) | |
|     if ( num_tiles_columns_minus1 != 0 \| num_tiles_rows_minus1 != 0 ) | |
|       loop_filter_across_tiles_enabled_flag | u(1) |
|   } | |
| } | |

(d)

| tile_info() { | Descriptor |
|---|---|
| num_tile_columns_minus1 | ue(v) |
| num_tile_rows_minus1 | ue(v) |
| tile_unit_width_idc | ue(v) |
| tile_unit_height_idc | ue(v) |
| uniform_spacing_flag | u(1) |
| if ( !uniform_spacing_flag ) { | |
|   for ( i = 0; i < num_tile_columns_minus1; i++ ) | |
|     column_width_in_unit_minus1[i] | ue(v) |
|   for ( i = 0; i < num_tile_rows_minus1; i++ ) | |
|     row_height_in_unit_minus1[i] | ue(v) |
|   } | |
| } | |

FIG. 4

(a)
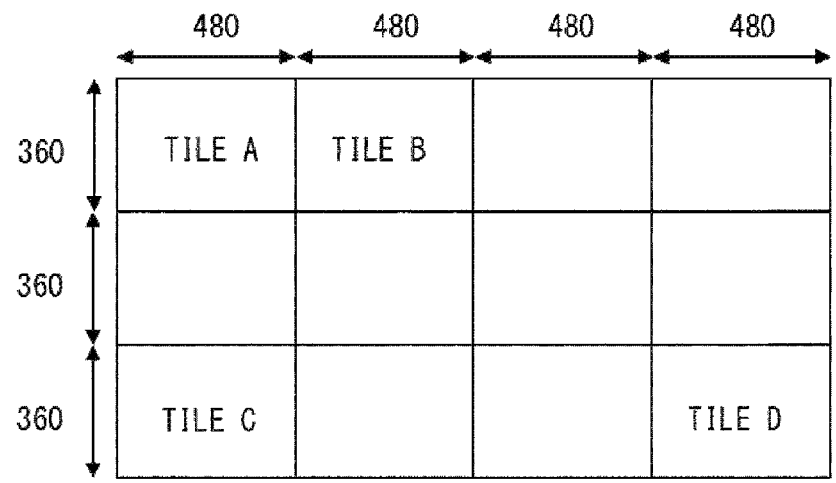
(b)
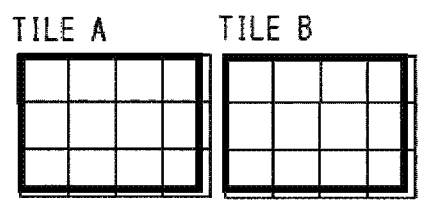
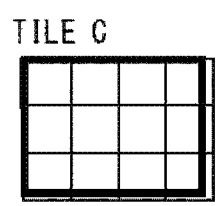     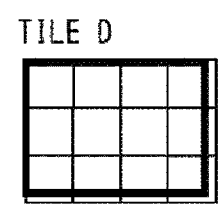
FIG. 8

| slice_segment_data( ) { | Descriptor |
|---|---|
|   do { | |
|     coding_tree_unit( ) | |
|     end_of_slice_segment_flag | ae(v) |
|     CtbAddrInTs++ | |
|     CtbAddrInRs = CtbAddrTsToRs[ CtbAddrInTs ] | |
|     if( !end_of_slice_segment_flag &&<br>      ( ( tiles_enabled_flag && TileId[ CtbAddrInTs ] !=<br>TileId[ CtbAddrInTs - 1 ] ) ||<br>      ( entropy_coding_sync_enabled_flag &&<br>        ( CtbAddrInRs % PicWidthInCtbsY == 0 ||<br>          TileId[ CtbAddrInTs ] !=<br>TileId[ CtbAddrRsToTs[ CtbAddrInRs - 1 ] ] ) ) )<br>    ) { | |
|       end_of_subset_one_bit /* equal to 1 */ | ae(v) |
|       byte_alignment( ) | |
|     } | |
|   } while( !end_of_slice_segment_flag ) | |
| } | |

| seq_parameter_set_rbsp() { | Descriptor |
|---|---|
| sps_video_parameter_set_id | u(4) |
| ... | |
| sps_seq_parameter_set_id | ue(v) |
| ... | |
| pic_width_in_luma_samples | ue(v) |
| pic_height_in_luma_samples | ue(v) |
| ... | ... |
| vui_parameters_present_flag | u(1) |
| if( vui_parameters_present_flag ) | |
|   vui_parameters( ) | |
| ... | |

(b)

| pic_parameter_set_rbsp() { | Descriptor |
|---|---|
| pps_pic_parameter_set_id | ue(v) |
| pps_seq_parameter_set_id | ue(v) |
| ... | |
| entropy_coding_sync_enabled_flag | u(1) |
| tile_parameters( ) | u(1) |
| ... | |

(c)

| tile_parameters() { | Descriptor |
|---|---|
| tiles_enabled_flag | u(1) |
| if ( tiles_enabled_flag ) { | |
|   tile_info() | |
|   if (num_tiles_columns_minus1!=0 || num_tiles_rows_minus1!=0) | |
|     loop_filter_across_tiles_enabled_flag | u(1) |
|   } | |
| } | |

(d)

| tile_info() { | Descriptor |
|---|---|
| num_tile_columns_minus1 | ue(v) |
| num_tile_rows_minus1 | ue(v) |
| uniform_spacing_flag | u(1) |
| if ( !uniform_spacing_flag ) { | |
|   for ( i = 0; i < num_tile_columns_minus1; i++ ) | |
|     column_width_in_unit_minus1[i] | ue(v) |
|   for ( i = 0; i < num_tile_rows_minus1; i++ ) | |
|     row_height_in_unit_minus1[i] | ue(v) |
|   } | |
| } | |

| slice_segment_data( ) { | Descriptor |
|---|---|
|   do { | |
|     coding_tree_unit( ) | |
|     end_of_slice_segment_flag | ae(v) |
|     CtbAddrInTs++ | |
|     CtbAddrInRs = CtbAddrTsToRs[ CtbAddrInTs ] | |
|     if( !end_of_slice_segment_flag && tiles_enabled_flag ) { | |
|       end_of_subset_one_bit /* equal to 1 */ | ae(v) |
|       byte_alignment( ) | |
|     } | |
|   } while( !end_of_slice_flag ) | |
| } | |

(b)

| coding_tree_unit( ) { | Descriptor |
|---|---|
|   rx = CtbAddrInRs % PicWidthInCtbsY | |
|   ry = CtbAddrInRs / PicWidthInCtbsY | |
|   if ( tile_enabled_flag ) { | |
|     CurrTileId = TileId[ CtbAddrInRs ] | |
|     xCtb = TileX[CurrTileId]+(rx-TileXInCtbsY[CurrTileId])<<CtbLog2SizeY | |
|     yCtb = TileY[CurrTileId]+(ry-TileYInCtbsY[CurrTileId])<<CtbLog2SizeY | |
|   } else { | |
|     xCtb = rx << CtbLog2SizeY | |
|     yCtb = ry << CtbLog2SizeY | |
|   } | |
|   if( slice_alf_enable_flag ){ | |
|     alf_ctb_flag[ 0 ][ rx ][ ry ] | ae(v) |
|     if( alf_chroma_ctb_present_flag ) { | |
|       if( alf_chroma_idc==1 || alf_chroma_idc==3 ) | |
|         alf_ctb_flag[ 1 ][ rx ][ ry ] | ae(v) |
|       if( alf_chroma_idc==2 || alf_chroma_idc==3 ) | |
|         alf_ctb_flag[ 2 ][ rx ][ ry ] | ae(v) |
|     } | |
|   } | |
|   if( slice_type = = I && qtbtt_dual_tree_intra_flag ) { | |
|     dual_tree_implicit_qt_split ( xCtb, yCtb, CtbLog2SizeY, 0) | |
|   else | |
|     coding_quadtree( xCtb, yCtb, CtbLog2SizeY, 0, SINGLE_TREE) | |
| } | |

| dual_tree_implicit_qt_split( x0, y0, log2CbSize, cqtDepth ) { | Descriptor |
|---|---|
|   if( log2CbSize > 6 ) { | |
|     x1 = x0 + ( 1 << ( log2CbSize - 1 ) ) | |
|     y1 = y0 + ( 1 << ( log2CbSize - 1 ) ) | |
|     dual_tree_implicit_qt_split( x0, y0, log2CbSize - 1, cqtDepth+1) | |
|     if( x1 - TileX[ CurrTileId ] < TileWidth[ CurrTileId ] ) | |
|       dual_tree_implicit_qt_split( x1, y0, log2CbSize-1, cqtDepth+1) | |
|     if( y1 - TileY[ CurrTileId ] < TileHeight[ CurrTileId ] ) | |
|       dual_tree_implicit_qt_split( x0, y1, log2CbSize-1, cqtDepth+1) | |
|     if(x1-TileX[CurrTileId]<TileWidth[CurrTileId] && y1-TileY[CurrTileId ]<TileHeight[CurrTileId]) | |
|       dual_tree_implicit_qt_split( x1, y1, log2CbSize-1, cqtDepth+1) | |
|   } else { | |
|     coding_quadtree( x0, y0, log2CbSize, cqtDepth, DUAL_TREE_LUMA ) | |
|     coding_quadtree( x0, y0, log2CbSize, cqtDepth, DUAL_TREE_CHROMA ) | |
|   } | |
| } | |

(b)

| coding_quadtree( x0, y0, log2CbSize, cqtDepth, treeType ) { | Descriptor |
|---|---|
|   if((((x0+(1<<log2CbSize)-TileX[CurrTileId]<=TileWidth[CurrTileId]) ? 1:0)+((y0+(1<<log2CbSize)-TileY[CurrTileId]<=TileHeight[CurrTileId]) ? 1:0)+(((1<<log2CbSize)<=MaxBtSizeY) ? 1:0))>=2 && log2CbSize>MinQtLog2SizeY) | |
|     split_cu_flag[ x0 ][ y0 ] | ae(v) |
|   } | |
|   if( split_cu_flag[ x0 ][ y0 ] ) { | |
|     x1 = x0 + ( 1 << ( log2CbSize - 1 ) ) | |
|     y1 = y0 + ( 1 << ( log2CbSize - 1 ) ) | |
|     coding_quadtree( x0, y0, log2CbSize - 1, cqtDepth + 1, treeType ) | |
|     if( x1 - TileX[ CurrTileId ] < TileWidth [ CurrTileId ] ) | |
|       coding_quadtree( x1, y0, log2CbSize - 1, cqtDepth+1, treeType) | |
|     if( y1 - TileY[ CurrTileId ] < TileHeight[ CurrTileId ] ) | |
|       coding_quadtree( x0, y1, log2CbSize - 1, cqtDepth + 1, treeType) | |
|     if( x1-TileX[CurrTileId]<TileWidth[CurrTileId] && y1-TileY[CurrTileId]<TileHeight[CurrTileId]) | |
|       coding_quadtree( x1, y1, log2CbSize - 1, cqtDepth + 1, treeType) | |
|   } else | |
|     multi_type_tree(x0,y0,1<<log2CbSize,1<<log2CbSize,0,0,0,treeType) | |
| } | |

FIG. 17

| | Descriptor |
|---|---|
| multi_type_tree( x0, y0, cbWidth, cbHeight, mttDepth, depthOffset, partIdx, treeType ) { | |
|   if((allowSplitBtVer \|\| allowSplitBtHor \|\| allowSplitTtVer \|\| allowSplitTtHor) && (x0+cbWidth-TileX[CurrTileId]<=TileWidth[CurrTileId]) && (y0+cbHeight-TileY[CurrTileId]<=TileHeight[CurrTileId])) | |
|     mtt_split_cu_flag | ae(v) |
|   if( mtt_split_cu_flag ) { | |
|     if((allowSplitBtHor \|\| allowSplitTtHor) && (allowSplitBtVer \|\| allowSplitTtVer)) | |
|       mtt_split_cu_vertical_flag | ae(v) |
|     if((allowSplitBtVer && allowSplitTtVer && mtt_split_cu_vertical_flag ) \|\| (allowSplitBtHor && allowSplitTtHor && !mtt_split_cu_vertical_flag)) | |
|       mtt_split_cu_binary_flag | ae(v) |
|     if( MttSplitMode[ x0 ][ y0 ][ mttDepth ] == SPLIT_BT_VER ) { | |
|       depthOffset += (x0+cbWidth-TileX[CurrTileId]>TileWidth[CurrTileId]) ? 1:0 | |
|       x1 = x0 + ( cbWidth / 2 ) | |
|       multi_type_tree(x0,y0,cbWidth/2,cbHeight,mttDepth+1,depthOffset, 0,treeType) | |
|       if( x1 - TileX[ CurrTileId ] < TileWidth[ CurrTileId ] ) | |
|         multi_type_tree(x1,y0,cbWidth/2,cbHeightY,mttDepth+1,depthOffset ,1,treeType) | |
|     } else if( MttSplitMode[ x0 ][ y0 ][ mttDepth ] == SPLIT_BT_HOR ) { | |
|       depthOffset += (y0+cbHeight-TileY[CurrTileId]>TileHeight[CurrTileId])?1:0 | |
|       y1 = y0 + ( cbHeight / 2 ) | |
|       multi_type_tree(x0,y0,cbWidth,cbHeight/2,mttDepth+1,depthOffset, 0,treeType) | |
|       if( y1 - TileY[ CurrTileId ] < TileHeight[ CurrTileId ] ) | |
|         multi_type_tree(x0,y1,cbWidth,cbHeight/2,mttDepth+1,depthOffset, 1,treeType) | |
|     } else if( MttSplitMode[ x0 ][ y0 ][ mttDepth ] == SPLIT_TT_VER ) { | |
|       x1 = x0 + ( cbWidth / 4 ) | |
|       x2 = x0 + ( 3 * cbWidth / 4 ) | |
|       multi_type_tree(x0,y0,cbWidth/4,cbHeight,mttDepth+1,depthOffset, 0,treeType) | |
|       multi_type_tree(x1,y0,cbWidth/2,cbHeight,mttDepth+1,depthOffset, 1,treeType) | |
|       multi_type_tree(x2,y0,cbWidth/4,cbHeight,mttDepth+1,depthOffset, 2,treeType) | |
|     } else { /* SPLIT_TT_HOR */ | |
|       y1 = y0 + ( cbHeight / 4 ) | |
|       y2 = y0 + ( 3 * cbHeight / 4 ) | |
|       multi_type_tree(x0,y0,cbWidth,cbHeight/4,mttDepth+1,depthOffset, 0,treeType) | |
|       multi_type_tree(x0,y1,cbWidth,cbHeight/2,mttDepth+1,depthOffset, 1,treeType) | |
|       multi_type_tree(x0,y2,cbWidth,cbHeight/4,mttDepth+1,depthOffset, 2,treeType) | |
|     } | |
|   } else | |
|     coding_unit( x0, y0, cbWidth, cbHeight, treeType ) | |
| } | |

| coding_tree_unit( ) { | Descriptor |
|---|---|
| rx = CtbAddrInRs % PicWidthInCtbsY | |
| ry = CtbAddrInRs / PicWidthInCtbsY | |
| xCtb = CtbColToCtbX[ rx ] | |
| yCtb = CtbColToCtbY[ ry ] | |
| if( slice_alf_enable_flag ) { | |
|   alf_ctb_flag[ 0 ][ rx ][ ry ] | ae(v) |
|   if( alf_chroma_ctb_present_flag ) { | |
|     if( alf_chroma_idc==1 \|\| alf_chroma_idc==3 ) | |
|       alf_ctb_flag[ 1 ][ rx ][ ry ] | ae(v) |
|     if( alf_chroma_idc==2 \|\| alf_chroma_idc==3 ) | |
|       alf_ctb_flag[ 2 ][ rx ][ ry ] | ae(v) |
|   } | |
| } | |
| if( slice_type == I && qtbtt_dual_tree_intra_flag ) { | |
|   dual_tree_implicit_qt_split ( xCtb, yCtb, CtbLog2SizeY, 0 ) | |
| else | |
|   coding_quadtree( xCtb, yCtb, CtbLog2SizeY, 0, SINGLE_TREE) | |
| } | |

(b)

| coding_tree_unit( ) { | Descriptor |
|---|---|
| rx = CtbAddrInRs % PicWidthInCtbsY | |
| ry = CtbAddrInRs / PicWidthInCtbsY | |
| if ( tile_enabled_flag ) { | |
|   xCtb = CtbColToCtbX[ rx ] | |
|   yCtb = CtbColToCtbY[ ry ] | |
| } else { | |
|   xCtb = rx << CtbLog2SizeY | |
|   yCtb = ry << CtbLog2SizeY | |
| } | |
| if( slice_alf_enable_flag ) { | |
|   alf_ctb_flag[ 0 ][ rx ][ ry ] | ae(v) |
|   if( alf_chroma_ctb_present_flag ) { | |
|     if( alf_chroma_idc==1 \|\| alf_chroma_idc==3 ) | |
|       alf_ctb_flag[ 1 ][ rx ][ ry ] | ae(v) |
|     if( alf_chroma_idc==2 \|\| alf_chroma_idc==3 ) | |
|       alf_ctb_flag[ 2 ][ rx ][ ry ] | ae(v) |
|   } | |
| } | |
| if( slice_type == I && qtbtt_dual_tree_intra_flag ) { | |
|   dual_tree_implicit_qt_split ( xCtb, yCtb, CtbLog2SizeY, 0 ) | |
| else | |
|   coding_quadtree( xCtb, yCtb, CtbLog2SizeY, 0, SINGLE_TREE) | |
| } | |

FIG. 19

VIDEO DECODING APPARATUS WITH PICTURE TILE STRUCTURE

CLAIM OF BENEFIT TO PRIOR APPLICATIONS

This application is a national stage application of International Patent Application PCT/JP2019/025010, filed Jun. 24, 2019, now published as WO/2020004349. International Patent Application PCT/JP2019/025010 claims the benefit of Japanese Patent Application 2018-124640, filed Jun. 29, 2018, Japanese Patent Application 2018-189948, filed Oct. 5, 2018, and Japanese Patent Application 2018-191532, filed Oct. 10, 2018. Japanese Patent Application 2018-124640, Japanese Patent Application 2018-189948, Japanese Patent Application 2018-191532, and International Patent Application PCT/JP2019/025010, now published as WO/2020004349, are incorporated herein by reference.

TECHNICAL FIELD

The embodiments of the present invention relate to a video decoding apparatus and a video coding apparatus.

BACKGROUND ART

A video coding apparatus which generates coded data by coding a video, and a video decoding apparatus which generates decoded images by decoding the coded data are used to efficiently transmit or record videos.

Specific examples of a video coding scheme include schemes proposed in H.264/AVC or High-Efficiency Video Coding (HEVC), for example.

In such a video coding scheme, images (pictures) constituting a video are managed by a hierarchy structure including slices obtained by splitting images, Coding Tree Units (CTUs) obtained by splitting slices, units of coding (also referred to as Coding Units (CUs)) obtained by splitting coding tree units, and Transform Units (TUs) obtained by splitting coding units, and are coded/decoded for each CU.

In such a video coding scheme, usually, a prediction image is generated based on a local decoded image that is obtained by coding/decoding an input image (a source image), and prediction residuals (which may be referred to also as "difference images" or "residual images") obtained by subtracting the prediction image from the input image are coded. Generation methods of prediction images include an inter-picture prediction (an inter prediction) and an intra-picture prediction (intra prediction).

Known examples of a method for splitting a picture into multiple units to perform parallel processing include a method for splitting the picture into slices, CTU lines (wave front segments), or tiles. The method for splitting into tiles has been limited to splitting in CTU units in the past.

In addition, NPL 1 is exemplified as a recent technique for video coding and decoding.

CITATION LIST

Non Patent Literature

NPL 1: "Algorithm Description of Joint Exploration Test Model 7", JVET-G1001, Joint Video Exploration Team (JVET) of ITU-T SG 16 WP 3 and ISO/IEC JTC 1/SC 29/WG 11, 2017 Aug. 19

SUMMARY OF INVENTION

Technical Problem

As described above, a tile size is limited to an integer multiple of the CTU, which causes problems in that it is difficult to perform splitting into tiles having the same size for load balance, and to configure a tile matching a face size of a 360-degree video.

In a case that loop filtering is performed in a small effective area of the CTU at a picture end, a tile end, or the like, there is a problem in that an overhead of the information for the loop filter increases and performance is not improved.

The present invention has been made in light of the foregoing, and has an object to provide tile splitting without the limitation of the integer multiple of the CTU and efficient loop filtering.

Solution to Problem

A video decoding apparatus according to an aspect of the present invention is a video decoding apparatus for splitting an image into coding tree units (CTUs) and decoding a video on a per-CTU basis, the video decoding apparatus including: a header decoder configured to decode tile unit information indicating a unit for a size of a tile from header information of a coding stream; and a coding tree (CT) decoder configured to split the tile into CTUs, wherein the header decoder derives a tile upper left position and a tile size by using the tile unit information.

BRIEF DESCRIPTION OF DRAWINGS

FIG. 2 is a diagram illustrating examples of splitting a CTU.

FIG. 4 illustrates syntax tables for tile information and the like.

FIG. 8 is a diagram illustrating tile splitting in a non-CTU size.

FIG. 10 is a syntax configuration for coding slice data.

FIG. 15 illustrates other examples of the syntax table for the tile information and the like.

FIG. 16 is a diagram illustrating examples of a syntax configuration of coding slice data and CTU information.

FIG. 17 is a diagram illustrating examples of a configuration of a syntax table for QT information.

FIG. 18 is a diagram illustrating an example of a configuration of a syntax table for MT information.

FIG. 19 is a diagram illustrating examples of a syntax configuration of the CTU information.

DESCRIPTION OF EMBODIMENTS

First Embodiment

Hereinafter, embodiments of the present invention will be described with reference to the drawings.

Figure 14:
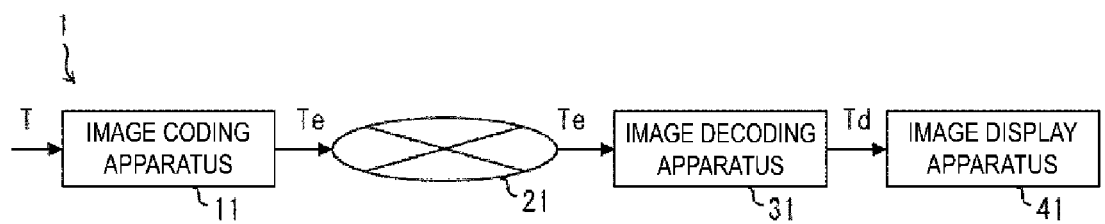
FIG. 14 is a schematic diagram illustrating a configuration of an image transmission system according to the present embodiment.

FIG. 14 is a schematic diagram illustrating a configuration of an image transmission system 1 according to the present embodiment.

The image transmission system 1 is a system in which a coding stream obtained by coding a coding target image is transmitted, the transmitted coding stream is decoded, and an image is displayed. The image transmission system 1 includes a video coding apparatus (image coding apparatus) 11, a network 21, a video decoding apparatus (image decoding apparatus) 31, and an image display apparatus (video display apparatus) 41.

An image T is input to the video coding apparatus 11.

The network 21 transmits a coding stream Te generated by the video coding apparatus 11 to the video decoding apparatus 31. The network 21 is the Internet, a Wide Area Network (WAN), a Local Area Network (LAN), or a combination thereof. The network 21 is not necessarily limited to a bidirectional communication network, and may be a unidirectional communication network configured to transmit broadcast waves of digital terrestrial television broadcasting, satellite broadcasting of the like. The network 21 may be substituted by a storage medium in which the coding stream Te is recorded, such as a Digital Versatile Disc (DVD) (trade name) or a Blue-ray Disc (BD) (trade name).

The video decoding apparatus 31 decodes each of the coding streams Te transmitted by the network 21, and generates one or multiple decoded images Td.

The video display apparatus 41 displays all or part of the one or multiple decoded images Td generated by the video decoding apparatus 31. For example, the video display apparatus 41 includes a display device such as a liquid crystal display and an organic Electro-luminescence (EL) display. Examples of a display type include stationary, mobile, HMD, and the like. In addition, in a case that the video decoding apparatus 31 has a high processing capability, an image having high image quality is displayed, and in a case that the apparatus has a lower processing capability, an image which does not require high processing capability and display capability.

Operator

Operators used in the present specification will be described below.

$>>$ is a right bit shift, $<<$ is a left bit shift, & is a bitwise AND, | is a bitwise OR, |= is an OR assignment operator, and || represents a logical sum.

x?y:z is a ternary operator to take y in a case that x is true (other than 0) and take z in a case that x is false (0).

Clip3 (a, b, c) is a function to clip c in a value equal to or greater than a and less than or equal to b, and a function to return a in a case of c<a, return b in a case of c>b, and return c in other cases (where a<=b).

abs(a) is a function that returns an absolute value of a.

Int(a) is a function that returns an integer value of a.

floor(a) is a function that returns a maximum integer smaller or equal to a.

ceil(a) is a function that returns a maximum integer greater or equal to a.

a/d represents a division of a by d (decimal places are rounded down).

Structure of Coding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 1:
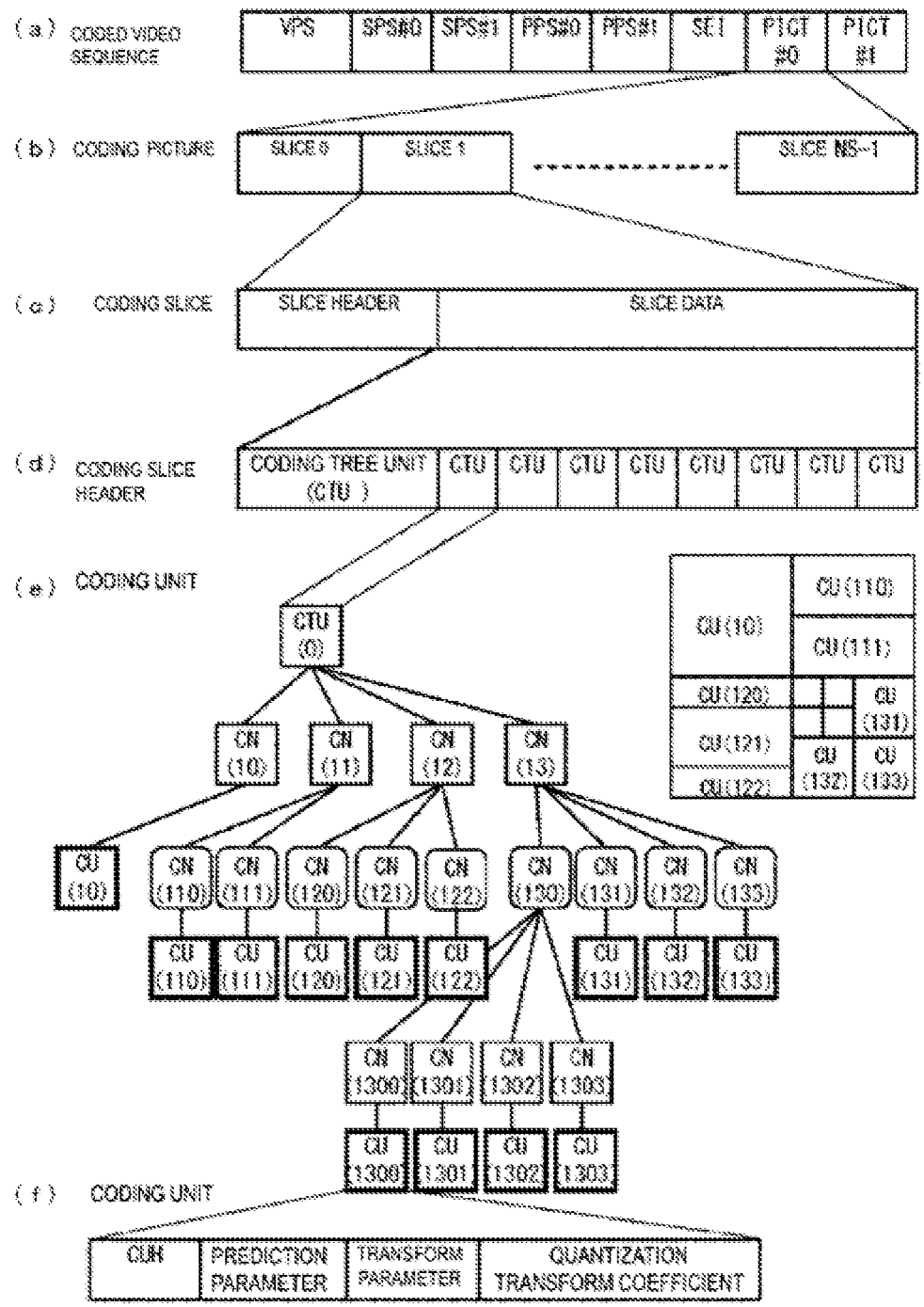
FIG. 1 is a diagram illustrating a hierarchical structure of data of a coding stream.

FIG. 1 is a diagram illustrating a hierarchical structure of data of the coding stream Te. The coding stream Te includes a sequence and multiple pictures constituting the sequence illustratively. (a) to (f) of FIG. 1 are diagrams illustrating a coded video sequence defining a sequence SEQ, a coding picture prescribing a picture PICT, a coding slice prescribing a slice S, a coding slice data prescribing slice data, a coding tree unit included in the coding slice data, and a coding unit included in the coding tree unit, respectively.

Coded Video Sequence

In the coded video sequence, a set of data referred to by the video decoding apparatus 31 to decode the sequence SEQ to be processed is defined. As illustrated in FIG. 1(a), the sequence SEQ includes a Video Parameter Set, a Sequence Parameter Set SPS, a Picture Parameter Set PPS, a picture PICT, and Supplemental Enhancement Information SEI.

In the video parameter set VPS, in a video including multiple layers, a set of coding parameters common to multiple videos and a set of coding parameters associated with the multiple layers and an individual layer included in the video are defined.

In the sequence parameter set SPS, a set of coding parameters referred to by the video decoding apparatus 31 to decode a target sequence is defined. For example, a width and a height of a picture are defined. Note that multiple SPSs may exist. In that case, any of multiple SPSs is selected from the PPS.

In the picture parameter set PPS, a set of coding parameters referred to by the video decoding apparatus 31 to decode each picture in a target sequence is defined. For example, a reference value (pic_init_qp_minus26) of a quantization step size used for decoding of a picture and a flag (weighted_pred_flag) indicating an application of a weighted prediction are included. Note that multiple PPSs may exist. In that case, any of multiple PPSs is selected from each picture in a target sequence.

Coding Picture

In the coding picture, a set of data referred to by the video decoding apparatus 31 to decode the picture PICT to be processed is defined. As illustrated in FIG. 1(b), the picture PICT includes slices 0 to NS−1 (NS is the total number of slices included in the picture PICT).

Note that hereinafter, in a case that it is not necessary to distinguish each of the slices 0 to NS−1, subscripts of reference signs may be omitted. In addition, the same applies to other data with subscripts included in the coding stream Te which will be described below.

Coding Slice

In the coding slice, a set of data referred to by the video decoding apparatus 31 to decode the slice S to be processed is defined. As illustrated in FIG. 1(c), the slice S includes a slice header and slice data.

The slice header includes a coding parameter group referred to by the video decoding apparatus 31 to determine a decoding method for a target slice. Slice type specification information (slice_type) indicating a slice type is one example of a coding parameter included in the slice header.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding, and the like. Note that an inter prediction is not limited to a uni-prediction or a bi-prediction, and a greater number of reference pictures may be used to generate a prediction image. Hereinafter, in a case that a P or B slice is referred, refer to a slice that includes a block that may employ an inter prediction.

Note that, the slice header may include a reference to the picture parameter set PPS (pic_parameter_set_id).

Coding Slice Data

In the coding slice data, a set of data referenced by the video decoding apparatus 31 to decode the slice data to be processed is defined. The slice data includes the CTU as illustrated in FIG. 1(d). The CTU is a block of a fixed size (for example, 128×128) constituting a slice, and may be referred to as a Largest Coding Unit (LCU).

Tile

Figure 3:
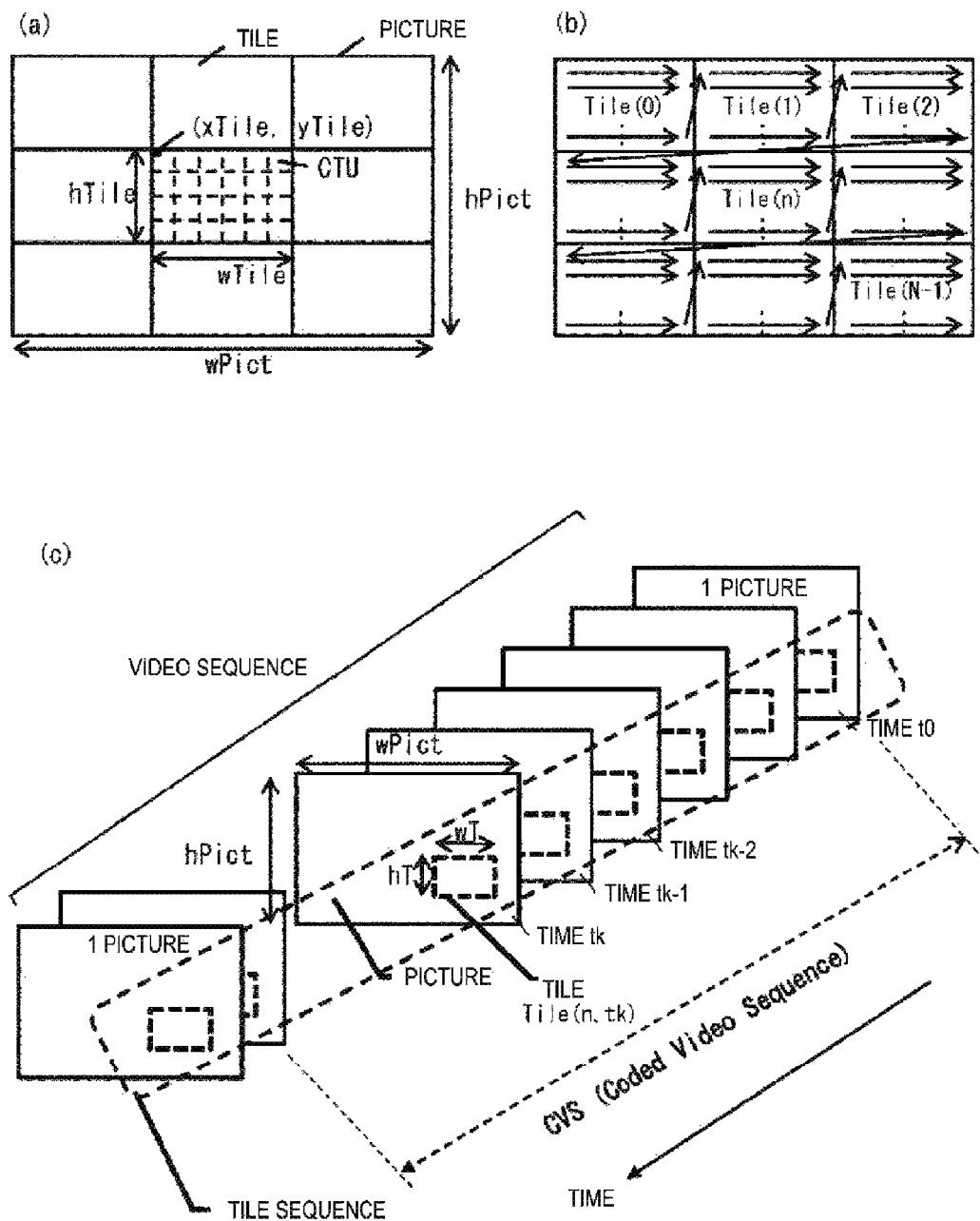
FIG. 3 is a diagram illustrating a tile.

FIG. 3(a) is a diagram illustrating an example of splitting a picture into N tiles (solid rectangles, the figure illustrates an example of N=9). The tile is further split into multiple CTUs (broken line rectangles). As illustrated in the center of FIG. 3(a), upper left coordinates, a width, and a height of a tile are designated by (xTile, yTile), wTile, and hTile, respectively. A width and a height of the picture is designated by wPict and hPict, respectively. Note that information regarding the number and size of split tiles is referred to as tile information, and details thereof are described below. Units of xTile, yTile, wTile, hTile, wPict, hPict are pixels. The width and height of the picture are set to pic_width_in_luma_samples and pic_height_in_luma_samples_that are notified in sequence_parameter_set_rbsp( ) (referred to as SPS) illustrated in FIG. 4(a).

$w\text{Pict}=\text{pic\_width\_in\_luma\_samples}$ $h\text{Pict}=\text{pic\_height\_in\_luma\_samples}$ FIG. 3(b) is a diagram illustrating a coding and decoding order of CTU in a case that the picture is split into the tiles. A number assigned to each tile is TileId (an identifier of the tile in the picture), the TileId may be assigned in raster scan order from a top left to a bottom right to the tiles in the picture. The CTUs are processed in raster scan order from a top left to a bottom right in each tile, and after the process in one tile ends, CTUs in the next tile are processed.

FIG. 3(c) is a diagram illustrating the tiles continuous in a time direction. As illustrated in FIG. 3(c), a video sequence includes multiple pictures continuous in the time direction. A tile sequence includes one or more tiles of time continuous in the time direction. In the figure w, Tile (n, tk) represents a tile having the TileId=n at a time tk. Note that a Coded Video Sequence (CVS) in the figure is a group of pictures from an intra picture to a picture immediately before another intra picture in decoding order.

FIG. 4 illustrates examples of syntax for the tile information and the like.

A parameter tile_parameters( ) for the tile is notified in the PPS (pic_parameter_set_rbsp( )) illustrated in FIG. 4(b). Hereinafter, a parameter being notified means a parameter being included in coded data (a bit stream), wherein the video coding apparatus codes the parameter and the video decoding apparatus decodes the parameter. As illustrated in FIG. 4(c), tile_parameters( ) notifies tile information tile_info( ) in a case that tile_enabled_flag indicating whether or not there is a tile is 1. In the case that the tile_enabled_flag is 1, the independent_tiles_flag (independent_decoding_tile_flag) indicating whether or not the tile can be independently decoded over multiple pictures continuous in time. In a case that independent_tiles_flag is 0, the tile is decoded with reference to neighboring tiles in the reference picture (the tile cannot be independently decoded). In a case that independent_tiles_flag is 1, the tile is decoded without reference to the neighboring tiles in the reference picture. In a case that the tiles are used, decoding is performed without reference to the neighboring tiles in the target picture regardless of the value of independent_tiles_flag, and thus, multiple tiles can be decoded in parallel. This flag, independent_tiles_flag, may be independent_decoding_region_flag that is a flag in units of regions such as a tile unit. As illustrated in FIG. 4(c), loop_filter_across_tiles_enable_flag is transmitted (presented) that indicates on or off of a loop filter at a tile boundary, the loop filter being applied to the reference picture in the case that the independent_tiles_flag is 0. In the case that independent_tiles_flag is 1, loop_filter_across_tiles_enable_flag may not be transmitted (presented) and may be always zero.

Note that in a case that the tiles are independently processed through the sequence, the independent tile flag independent_tiles_flag may be notified in the SPS as illustrated in FIG. 4(a).

As illustrated in FIG. 4(d), for example, Tile information tile_info( ) includes num_tile_columns_minus1, num_tile_rows_minus1, tile_unit_width_idc, tile_unit_height_idc, uniform_spacing_flag, column_width_in_unit_minus1[i], and row_height_in_unit_minus1[i]. Here, num_tile_columns_minus1 and num_tile_rows_minus1 represent values obtained by subtracting 1 from the numbers M and N of tiles in the picture in the horizontal and vertical directions, respectively. uniform_spacing_flag is a flag indicating whether or not a picture is split into tiles evenly as much as possible. In a case that a value of uniform_spacing_flag is 1, the video coding apparatus and the video decoding apparatus (header decoder 3020) derive a width and height of the tile from the numbers of tiles and identifiers indicating tile minimum units (tile unit identifiers) (tile_unit_width_idc, tile_unit_height_idc) in the picture in the horizontal and vertical directions, respectively, so that the tile widths and heights of the respective tiles of the picture are as equally as possible in units of certain size.

The header decoder 3020 derives the tile minimum units wUnitTile and hUnitTile from the tile unit identifier tile_unit_width_idc and tile_unit_height_idc (detailed below).

$w\text{UnitTile}=1<<(\log 2\text{CbSize}+\text{tile\_unit\_width\_idc})$ $h\text{UnitTile}=1<<(\log 2\text{CbSize}+\text{tile\_unit\_height\_idc})$ The header decoder 3020 derives the numbers M and N of tiles in the picture in the horizontal and vertical directions as follows. M represents numTileColumns and N represents numTileRows.

$M = \text{num\_tile\_columns\_minus1} + 1$ $N = \text{num\_tile\_rows\_minus1} + 1$ $\text{numTileColumns} = M = \text{num\_tile\_columns\_minus1} + 1$ $\text{numTileRows} = N = \text{num\_tile\_columns\_minus1} + 1$ The header decoder 3020 derives a tile size as follows, such that the tile size is a multiple of a minimum size (minimum unit) wUnitTile or hUnitTile of the tile. Here, wPictInUnitTile and hPictInUnitTile represent values representing wPict and hPict in units of wUnitTile and hUnitTile, respectively.

$w\text{PictInUnitTile} = \text{ceil}(w\text{Pict}/w\text{UnitTile})$ $h\text{PictInUnitTile} = \text{ceil}(h\text{Pict}/h\text{UnitTile})$ $w\text{Tile}[m] = \text{ceil}(w\text{PictInUnitTile}/M) * w\text{UnitTile}$
$(0 <= m < M)$ $h\text{Tile}[n] = \text{ceil}(h\text{PictInUnitTile}/N) * h\text{UnitTile} (0 <= n < N)$ Alternatively, the header decoder 3020 may derive from the following equations.

$w\text{Tile}[m] = \text{floor}(w\text{Pict}/M/w\text{UnitTile}) * w\text{UnitTile}$
$(0 <= m < M)$ $h\text{Tile}[n] = \text{floor}(h\text{Pict}/N/h\text{UnitTile}) * h\text{UnitTile}$
$(0 <= n < N)$ Alternatively, the header decoder 3020 may derive from the following equations.

for (m=0; m<M; m++)

$w\text{Tile}[m] = ((m+1) * w\text{PictInUnitTile}/M - m * w\text{PictInUnitTile}/M) * w\text{UnitTile}$ for (n=0; n<N; n++)

$h\text{Tile}[n] = ((n+1) * h\text{PictInUnitTile}/N - n * h\text{PictInUnitTile}/N) * h\text{UnitTile}$ In the case that a value of uniform_spacing_flag is 0, the tile widths and heights of the respective tiles in the picture are individually configured. The video coding apparatus codes a tile width column_width_in_unit_minus1 [i] of each tile (the value representing wTile in FIG. 3 in units of wUnitTile) and a tile height row_height_in_unit_minus1 [i] (the value representing hTile in FIG. 3 in units of hUnitTile) tile by tile. The header decoder 3020 in the video decoding apparatus decodes tile sizes wTile[m] and hTile[n] for each tile, based on the coded (column_width_in_unit_minus1[ ] and row_width_in_unit_minus1[ ]).

$w\text{Tile}[m] = (\text{column\_width\_in\_unit\_minus1}[m] + 1) * w\text{UnitTile} (0 <= m < M-1)$ $h\text{Tile}[n] = (\text{row\_height\_in\_unit\_minus1}[m] + 1) * h\text{UnitTile} (0 <= n < N-1)$ $w\text{Tile}[M-1] = \text{ceil}((w\text{Pict} - \text{sum\_}m(w\text{Tile}[m]))/w\text{UnitTile}) * w\text{UnitTile}$ $h\text{Tile}[N-1] = \text{ceil}((h\text{Pict} - \text{sum\_}n(h\text{Tile}[n]))/h\text{UnitTile}) * h\text{UnitTile}$ Here, sum_m(wTile[m]) represents a sum of wTile (0<=M-1), and sum_n(hTile[n]) represents a sum of hTile (0<=n N-1).

Alternatively, the wTile[M-1] and the hTile[N-1] at the picture end may be simply as described below in a case that the picture size is not an integer multiple of the tile minimum unit.

$w\text{Tile}[M-1] = w\text{Pict} - \text{sum\_}m(w\text{Tile}[m])$ $h\text{Tile}[N-1] = h\text{Pict} - \text{sum\_}n(h\text{Tile}[n])$ However, in this case, the picture end is desirably appropriately processed by padding, cropping, or the like so that the processing unit matches the tile minimum unit or a minimum CU size.

Note that a tile at a position (m, n) is also represented by the identifier TileId, and TileId may be calculated as described below.

$\text{TileId} = n * M + m$

Alternatively, in a case the TileId is known, (m, n) representing the position of the tile may be calculated from TileId.

$m = \text{TileId} \% M$ $n = \text{TileId}/M$

The header decoder 3020 decodes tile unit information indicating a unit of tile size. In a case that the minimum units of tile width and height are wUnitTile and hUnitTile, respectively, the width and height of the tile are configured to an integer multiple of wUnitTile and hUnitTile, respectively.

For example, the header decoder 3020 decodes the tile unit identifiers tile_unit_width_idc and tile_unit_height_idc from the coded data. The unit of tile size may be a constant (including 1) multiple of a minimum size of the coding unit CU. In a case that the CTU is a square with equal width and height, the unit of tile size may be derived by decoding only tile_unit_width_idc and assuming tile_unit_height_idc=tile_unit_width_idc. At this time, tile_unit_width_idc and tile_unit_height_idc may be referred to as tile_unit_size_idc.

Configuration Method 1

In a case that the tile unit identifier is 0, the header decoder 3020 configures the units of tile size as the CTU units. Specifically, wUnitTile=ctuWidth is configured in a case of tile_unit_width_idc=0, and hUnitTile=ctuHeight is configured in a case of tile_unit_width_idc=0. Here, ctuWidth is a width of the CTU and ctuHeight is a height of the CTU.

Furthermore, in a case that the tile unit identifier is other than 0, the header decoder 3020 may configure the unit of the tile size to be a constant multiple of the minimum size of the coding unit CU as described below.

$w\text{UnitTile} = (\text{tile\_unit\_width\_idc} == 0)?\text{ctuWidth}:1 << (\log 2\text{CbSize} + \text{tile\_unit\_width\_idc} - 1)$ $h\text{UnitTile} = (\text{tile\_unit\_height\_idc} == 0)?\text{ctuHeight}:1 << (\log 2\text{CbSize} + \text{tile\_unit\_height\_idc} - 1)$ where log 2CbSize=log 2(minCU) and minCU represents the minimum size of the coding unit CU.

Note that the CTU size ctuSize=ctuWidth=ctuHeight may be derived as described below by decoding a syntax element log 2_min_luma_coding_block_size_minus3 defining the minimum CU size, and a syntax element log 2_diff_max_min_luma_coding_block_size indicating the CU size using a logarithm of a difference from the minimum CU size.

$\log 2\text{CbSize} = \log 2\_\text{min\_luma\_coding\_block\_size\_minus3} + 3$ $\log 2\text{CtuSize} = \log 2\text{CbSize} + \log 2\_\text{diff\_max\_min\_luma\_coding\_block\_size}$ $$minCU=1<<\log 2CbSize$$

$$ctuSize=1<<\log 2CtuSize$$

Note that in a case that the tile unit identifier is not 0, the tile unit may be configured to be a constant (power of 2) multiple of the minimum size of the coding unit CU.

$$wUnitTile=(tile\_unit\_width\_idc==0)?ctuWidth:1<<(\log 2CbSize+\log 2DiffTileUnitSize)$$

$$hUnitTile=(tile\_unit\_height\_idc==0)?ctuHeight:1<<(\log 2CbSize+\log 2DiffTileUnitSize)$$

where Log 2DiffTileUnitSize represents a constant that defines a tile unit. For example, configuring the constant as 1, 2, and 3 leads the tile unit to be configured to 4, 8, and 16 times the minimum CU size, respectively. For example, in a case that the CU size is 4, the tile unit is configured to be 8, 16, and 32. Furthermore, the maximum value may be clipped to be the CTU size.

Configuration Method 2

The tile information is a tile unit identifier tile_unit_width_idc ranging from 0 to a prescribed number, and the unit of tile size may be configured by $1<<(\log 2(minCU)+tile\ unit\ identifier)$. That is, the header decoder 3020 may decode tile_unit_width_idc and tile_unit_height_idc (or tile_unit_size_idc) to configure the tile unit as follows.

$$wUnitTile=1<<(\log 2CbSize+tile\_unit\_width\_idc)$$

$$hUnitTile=1<<(\log 2CbSize+tile\_unit\_height\_idc)$$

In a case that the CTU is a square with equal width and height, the above-described equations are equivalent to decoding the tile_unit_size_idc to configure as follows. The description of the case of only the squares is omitted because it is obvious.

$$wUnitTile=hUnitTile=ctuSize>>tile\_unit\_size\_idc$$

Note that the tile unit identifier may not be explicitly coded, and the tile unit may be configured to be a constant (power of 2) multiple of the minimum size of the coding unit CU.

$$wUnitTile=1<<(\log 2CbSize+\log 2DiffTileUnitSize)$$

$$hUnitTile=1<<(\log 2CbSize+\log 2DiffTileUnitSize)$$

where Log 2DiffTileUnitSize represents a constant that defines a tile unit. Furthermore, the maximum value may be clipped to the CTU size.

$$wUnitTile=\min(ctuWidth,1<<(\log 2CbSize+\log 2DiffTileUnitSize))$$

$$hUnitTile=\min(ctuHeight1<<(\log 2CbSize+\log 2DiffTileUnitSize))$$

Configuration Method 3

The tile information is a tile unit identifier ranging from 0 to a prescribed number, and the unit of tile size is configured, by $1<<(\log 2(CTU\ size)-tile\ unit\ identifier)$, to be one over power of 2 of the CTU size. That is, the header decoder 3020 may decode tile_unit_width_idc and tile_unit_height_idc (or tile_unit_size_idc) to configure the tile unit as follows.

$$wUnitTile=1<<(\log 2CtuWidthY-tile\_unit\_width\_idc)$$

$$hUnitTile=1<<(\log 2CtuHeightY-tile\_unit\_height\_idc)$$

where log 2CtuWidthY=log 2(ctuWidth) and log 2CtuHeightY=log 2(ctuHeight).

Note that the width and height of the CTU size may be configured to be the same value.

$$wUnitTile=1<<(\log 2CtuSize-tile\_unit\_width\_idc)$$

$$hUnitTile=1<<(\log 2CtuSize-tile\_unit\_height\_idc)$$

where log 2CtuSize=log 2(ctuWidth)=log 2(ctuHeight).

In this case, it is also appropriate to refer to tile_unit_width_idc as log 2_diff_luma_tile_unit_size because of a representation of a logarithm of a difference.

Note that, as described below, the tile unit may be clipped to be a minimum size of a multiple of 8.

$$wUnitTile=\max(8,ctuWidth>>tile\_unit\_width\_idc)$$

$$hUnitTile=\max(8,ctuHeight>>tile\_unit\_height\_idc)$$

As a result, the tile width is always a multiple of 8, and thus, effects described in (configuration method 5) are also achieved.

Furthermore, the unit size may be clipped to be a minCTU size.

$$wUnitTile=\max(minCTU, ctuWidth>>tile\_unit\_width\_idc)$$

$$hUnitTile=\max(minCTU, ctuHeight>>tile\_unit\_height\_idc)$$

As a result, the tile width is always a multiple of a minimum size of the CTU, and thus, effects described in (configuration method 5) are also given.

Furthermore, a possible range of the tile_unit_width_idc may be limited. For example, in a case that a minimum value of ctuWidth>>tile_unit_width_idc is minCTU, $$ctuWidth>>tile\_unit\_width\_idc>=minCTU$$

$$ctuWidth>=minCTU<<tile\_unit\_width\_idc$$

$$ctuWidth>=minCTU*(1<<tile\_unit\_width\_idc)$$

$$(1<<tile\_unit\_width\_idc)<=ctuWidth/minCTU$$

$$tile\_unit\_width\_idc<=\log 2(ctuWidth)-\log 2(minCTU),$$

and thus, tile_unit_width_idc is limited to 0 or greater and log 2(ctuWidth)−log 2(minCTU) or smaller. That is, the video decoding apparatus can use a tile unit that is a multiple of minCTU by decoding the coded data that is limited to 0 or greater and log 2(ctuWidth)−log 2(minCTU) or smaller.

Similarly, the video decoding apparatus can use a tile unit that is a multiple of 8 by decoding the coded data that is limited to 0 or greater and log 2(ctuWidth)−log 2(8)=log 2(ctuWidth)−3 or smaller. In a case of a multiple of 16 or 32 rather than a multiple of 8, the log 2(8), that is 3, described above may be set to 4 or 5.

Configuration Method 4

The tile information is a tile unit identifier ranging from 0 to a prescribed number, and the unit of tile size is configured, by CTU size>>tile unit identifier, to be one over power of 2 of the CTU size. That is, the header decoder 3020 may decode tile_unit_width_idc and tile_unit_height_idc (or tile_unit_size_idc) to configure the tile unit as follows.

$$wUnitTile=ctuWidth>>tile\_unit\_width\_idc$$

$$hUnitTile=ctuHeight>>tile\_unit\_height\_idc$$

Since the configuration method 3 is equivalent to the configuration method 4, the method described in the (configuration method 3) can be used for the limitations on tile_unit_width_idc and tile_unit_height_idc (or tile_unit_size_idc).

Configuration Method 5

The header decoder 3020 does not decode the tile unit identifiers (tile_unit_width_idc and tile_unit_height_idc), and configure wUnitTile and hUnitTile to be a prescribed value TileUnit. The prescribed value TileUnit is preferably a multiple of 8, in particular, any of 8, 16, and 32. The tile information tile_info( ) is notified as in FIG. 15(*d*) instead of FIG. 4(*d*), and the header decoder 3020 decodes this tile information.

$$wUnitTile=TileUnit$$

$$hUnitTile=TileUnit$$

where TileUnit is a multiple of 8, such as 8, 16, or 32. In a case that the tile unit is a multiple of 8, the pixel data of the tile width may be a multiple of 8, even in a cases that bitDepth of the pixel is not a multiple of 8, such as 10 bits. Accordingly, even in a case that the memory is arranged, the tile boundary is always at the byte (8 bits) boundary and there is no need for a memory gap between the tiles in a case that the tile is arranged in the memory. In the absence of gaps, the memory of the gap portion is not necessary and can be transferred continuously, which provides the effect that memory size can be reduced and fast transfer is possible. Further, in a case of a multiple of 16, the tile width data may be a multiple of 128 bits (in a case of bitDepth=8 bit), allowing fast access in burst access of many memories (e.g., DDR).

Furthermore, in a case of 16 or 32, an effect of matching the minimum CTU size described below is achieved.

Configuration Method 6

The header decoder 3020 does not decode the tile unit identifiers (tile_unit_width_idc and tile_unit_height_idc), and configure wUnitTile and hUnitTile to be a prescribed value TileUnit. The prescribed value TileUnit is preferably the minimum size of the CTU (minimum CTU size). In this case, the tile information tile_info( ) is notified as in FIG. 15(*d*) instead of FIG. 4(*d*), and the header decoder 3020 decodes this tile information.

$$wUnitTile=TileUnit$$

$$hUnitTile=TileUnit$$

$$TileUnit=1<<(\log 2\_min\_luma\_coding\_tree\_block\_size\_minus4+4)$$

where log 2_min_luma_coding_block_size_minus4 is a value obtained by subtracting 4 from expression of power of 2 of the minimum size of the CTU. For example, in a case of 0, 1, 2, and 3, the minimum CTU size is 16, 32, 64, and 128, respectively. Note that log 2_min_luma_coding_block_size_minus4 defining the minimum CTU size may be coded with coded data as a syntax element or may be a constant. For example, in the case of a constant, the minimum CTU size is typically, 16 or 32, and thus, matches the (configuration method 5).

The minimum CTU size may be configured at a profile or a level defining the function and capability of the video decoding apparatus. The profile or level, which is used for negotiation between apparatuses, is transmitted in a relatively higher parameter set or header, for example, a syntax element of the SPS, profile_idc or level_idc.

In the case that the tile unit is a multiple of the minimum CTU size, the tile width is always a multiple of the minimum CTU size. Typically, in a case that the picture is stored in the memory, the memory arrangement is optimized based on the possible range of the CTU size being limited (e.g., 16, 32, or 64). In a case that the tile width is an integer (power of 2) multiple of the CTU size, the memory arrangement can be performed also in the case of the tile in the same manner as the picture, and thus, the effect of saving memory and high-speed access of the image can be achieved.

Configuration Method 7

The tile information is a tile unit identifier ranging from 0 to a prescribed number, and the unit of tile size is configured, by 1<<(log 2(minimum CTU size)+tile unit identifier), to be an integer (power of 2) multiple of the minimum CTU size. In the (configuration method 7), the tile unit identifier is a logarithmic representation of a multiple of the minimum CTU size. That is, the header decoder 3020 may decode tile_unit_width_idc to configure the tile unit as follows.

$$wUnitTile=1<<(\log 2CtuUnitSize+tile\_unit\_width\_idc)$$

$$hUnitTile=1<<(\log 2CtuUnitSize+tile\_unit\_height\_idc)$$

where the minimum size of the CTU minCTU=ctuUnitSize=1<<(log 2_min_luma_coding_tree_block_size_minus4+4) and log 2CtuUnitSize=log 2_min_luma_coding_tree_block_size_minus4+4.

Configuration Method 8

The tile information is a tile unit identifier ranging from 0 to a prescribed number, and the unit of tile size is configured by maximum CTU size>>tile unit identifier. In the (configuration method 8), the tile unit identifier is a logarithmic representation of a multiple of the maximum CTU size (one over a power of 2). That is, the header decoder 3020 may decode tile_unit_width_idc to configure the tile unit as follows.

$$wUnitTile=ctuUnitSize>>tile\_unit\_width\_idc$$

$$hUnitTile=ctuUnitSize>>tile\_unit\_height\_idc$$

Configuration Method 9

In the (configuration method 9), the prescribed value TileUnit is configured to be an integer multiple of the minimum CTU size, ctuSize, in the horizontal direction of the tile, and to be 8 or 16 in the vertical direction. The header decoder 3020 decodes this tile unit information. The tile minimum unit is configured by equations below, for example.

$$wUnitTile=ctuSize$$

$$hUnitTile=8$$

Control Information Configuration Unit

A tile information configuration unit configures upper left coordinates (xTile, yTile) of the tile based on the tile minimum units wUnitTile and hUnitTile. Furthermore, the tile information configuration unit configures a width and height of the tile in CTU units, tileWidthInCtus (=TileWidthInCtbsY) and tileHeightInCtus (=TileHeightInCtbsY), respectively.

Step 1

Derived from the tile minimum units wUnitTile and hUnitTile, and a picture widths wPict and hPict are picture widths wPictInUnitTile and hPictInUnitTile in tile units (wUnitTile and hUnitTile).

$$wPictInUnitTile=divRoundUp(wPict,wUnitTile)$$

$$hPictInUnitTile=divRoundUp(hPict,hUnitTile)$$

where divRoundUp (x, y)=(x+y−1)/y.

That is, a minimum integer equal to or greater than a value obtained by dividing x by y is returned. That is, ceil(x/y) may be used.

Step 2

The tile information configuration unit derives upper left coordinates (xTile, yTile) of the tile indicated by a tile unit position (col, row) in the picture. Hereinafter, intra-picture coordinates mean coordinates of a picture coordinate system, with a upper left (0, 0) of the picture, and intra-tile coordinates mean coordinates of a tile coordinate system, with upper left (0, 0) of each tile. A tile column position col is looped from 0 to numTileColumns−1, numTileColumns representing the number of tile columns and the minimum unit wUnitTile is used to derive a X coordinate tx[col] and a width tw[col] for each col of each tile. Similarly, a tile row position row is looped from 0 to numTileRows−1, numTileRows representing the number of tile rows and the minimum unit hUnitTile is used to derive a Y coordinate ty[row] and a height th[row] for each row of each tile.

In the case that uniform_spacing_flag is 1, the tile information configuration unit splits the picture into numTileColumns xnumTileRows (=M×N) tiles, and derives the tile sizes tw[col] and th[row], and the X coordinate tx[col] and Y coordinate ty[row] of the tile. Specifically, as expressed by a pseudo-code below, the picture width wPict and the number numTileColumns of tile columns are used to derive tx[col] and tw [col], and the picture width hPict and the number numTileRows of tile columns are used to derive ty[row] and th[row]. The values already determined as above hTile and wTile may be used for ty and tw. Note that min( ) is applied to wPict−tx[col] and tw[col] in order to ensure that the tile has a size not exceeding the picture end.

```
for (col=0; col<numTileColumns; col++)
{
tx[col]=wUnitTile*(col*wPictInUnitTile/numTileColumns)
tw[col]=wUnitTile*((col+1)*wPictInUnitTile/numTileColumns)−tx[col]
tw[col]=min(wPict−tx[col], tw[col])
}
for (row=0; row<numTileRows; row++)
{
ty[row]=hUnitTile*(row*hPictInUnitTile/numTileRows)
th[row]=hUnitTile*((row+1)*hPictInUnitTile/numTileRows)−ty[row]
th[row]=min(hPict−ty[row], th[row])
}
```

In the case that the uniform_spacing_flag is 0, the tile information configuration unit splits the picture using the tile size wTile(col) and hTile(row) to derive the X coordinate tx[col] and the Y coordinate ty[row] of the tile. Specifically, as expressed by a pseudo-code below, the picture width wPict and the tile column width wTile[col] are used to derive tx[col], and the picture height hPict and the tile row height hTile[row] are used to derive ty[row].

```
for (col=0; col<numTileColumns−1; col++)
{
tw[col]=wTile[col]=(column_width_in_unit_minus1[col]+1)*wUnitTile
tx[col+1]=tx[col]+tw[col]
}
tw[numTileColumns−1]=wPict−tx[numTileColumns−1]
for (row=0; row<numTileRows−1; row++)
{
th[row]=hTile[row]=(column_height_in_unit_minus1[row]+1)*hUnitTile
ty[row+1]=ty[row]+th[row]
}
th[numTileRows−1]=hPict−ty[numTileRows−1]
```

The tile information configuration unit stores the derived tile X coordinate tx[col] and Y coordinate ty[row], and the tile size tw[col] and th [row] to the intra-picture upper left tile coordinates xTile[TileId] and yTile[TileId], and the tile size wTile[TileId] and hTile[TileId] that are indicated by the tile ID.

```
for (row=0; row<numTileRows;row++)
{
for (col=0; col<numTileColumns;col++)
{
TileId=row*numTileColumns+col
xTile[TileId]=tx[col]
yTile[TileId]=ty[row]
wTile[TileId]=tw[col]
hTile[TileId]=th[row]
tileWidthInCtus[TileId]=divRoundUp(tw[col], ctuWidth)
tileHeightInCtus[TileId]=divRoundUp(th[row], ctuHeight)
}
}
for (PicWidthInCtbsY=0, i=0; i<=num_tile_columns_minus1; i++)
PicWidthInCtbsY+=tileWidthInCtus[i]
for (PicHeightInCtbsY=0, j=0; j<=num_tile_rows_minus1; j++)
PicHeightInCtbsY+=tileHeightInCtus[j]
```

Note that the tile information configuration unit may perform the following operations which are the same operations as above, although the temporary variables are different in the following expressions.

```
if (uniform_spacing_flag) {
for (i=0; i<=num_tile_columns_minus1; i++)
colWidth[i]=((i+1)*wPictInUnitTile)/(num_tile_columns_minus1+1)−(i*hPictInUnitTile)/(num_tile_columns_minus1+1))
for (j=0; j<=num_tile_rows_minus1; j++)
rowHeight[j]=((j+1)*hPictInUnitTile)/(num_tile_rows_minus1+1) (j*hPictInUnitTile)/(num_tile_rows_minus1+1))
else {
colWidth[num_tile_columns_minus1]=wPictInUnitTile
for (i=0; i<=num_tile_columns_minus1; i++) {
colWidth[i]=column_width_minus1[i]+1
colWidth[num_tile_columns_minus1]−=colWidth[i]
}
rowHeight[num_tile_rows_minus1]=hPictInUnitTile
for (j=0; j<=num_tile_rows_minus1; j++) {
rowHeight[j]=row_height_minus1 [j]+1
rowHeight[num_tile_rows_minus1]−=rowHeight[j]
}
}
for (colX[0]=0, i=0; i<=num_tile_columns_minus1; i++)
colX[i+1]=colX[i]+colWidth[i]*wUnitTile
for (colY[0]=0, j=0; j<=num_tile_rows_minus1; j++)
colY[j+1]=colY[j]+colRow[j]*hUnitTile
for (colBd[0]=0, i=0; i<=num_tile_columns_minus1; i++)
colBd[i+1]=colBd[i]+Ceil(colWidth[i]*wUnitTile/ctuWidth)
for (rowBd[0]=0, j=0; j<=num_tile_rows_minus1; j++)
rowBd[j+1]=rowBd[j]+Ceil(rowHeight[j]*hUnitTile/ctuHeight)
for (PicWidthInCtbsY=0, i=0; i<=num_tile_columns_minus1; i++)
PicWidthInCtbsY+=Ceil(colWidth[i]*TileUnitSizeY/CtbSizeY)
for (PicHeightInCtbsY=0, j=0; j<=num_tile_rows_minus1; j++)
```

PicHeightlnCtbsY+=Ceil(rowHeight[j]*TileUnitSizeY/
   CtbSizeY)
Note that the derivation may be made as follows for the entire picture.
   for (i=0; i<NumTilesInPic; i++) {
   col=i % (num_tile_columns_minus1+1)
   row=i/(num_tile_columns_minus1+1)
   TileWidth [i]=colWidth[col]*TileUnitSizeY
   TileHeight [i]=rowHeight[row]*TileUnitSizeY
   TileWidthInCtbsY[i]=Ceil(TileWidth[i]/CtbSizeY)
   TileHeightInCtbsY[i]=Ceil(TileHeight[i]/CtbSizeY)
   TileX[i]=TileColX[col]
   TileY[i]=TileRowY[row]
   TileXInCtbsY[i]=colBd[col]
   TileYInCtbsY[i]=rowBd[row]
   }

As described above, for the slice data (slice_segment_data( )), the tile information starting at the position (xTile, yTile) on the picture is notified in CTU units by using the information notified in the PPS illustrated in FIG. 4(b). Specifically, the tile may be split into CTUs (width of ctuWidth, height of ctuHeight) with the upper left coordinates (0, 0) of each tile starting from (xTile, yTile) on the picture to notify the coded data coding_quadtree( ) for each CTU.

The header decoder 3020 decodes header information from the coding stream Te that is input from the outside and coded in units of network abstraction layer (NAL). The header decoder 3020 derives the tile (TileId) required for display from control information that is input from the outside and indicates an image area to be displayed on the display or the like. The header decoder 3020 extracts coded tiles required for display from the coding stream Te. The coded tiles are split into the CTUs and processed by a CT information decoder (CT decoder) 3021 in accordance with syntax in the coded data. The tile information includes, specifically, the number M of tiles in the horizontal direction, the number N of tiles in the vertical direction, the tile width wTile[m], and the tile height hTile[n] calculated from the syntaxes such as num_tile_columns_minus1, num_tile_rows_minus1, uniform_spacing_flag, column_width_in_unit_minus1[i], and row_height_in_unit_minus1[i].

FIG. 8 illustrates examples of splitting a tile into other than an integer multiple of the CTU size. FIG. 8(a) illustrates a technique of the present embodiment, in which an HD image of 1920×1080 is split into 4×3 tiles. In the present embodiment, in splitting into 4×3 tiles, the splitting can be made such that the all tiles have equal sizes (480×360), and thus, an effect of load balance equal between multiple processors or hardware is achieved. The tile size can be a size other than an integer multiple of the CTU regardless of the picture boundary. FIG. 8(b) is a diagrams illustrating splitting of each tile into the CTUs. In splitting into the CTUs, in a case that the tile size is not an integer multiple of the CTU size, a crop offset region is provided outside the tile. Specifically, as illustrated in a TILE B, the CTU splitting is performed with reference to an upper left of each tile. Thus, the upper left coordinates of the CTU is not limited to an integer multiple of the CTU size.

Figure 9:
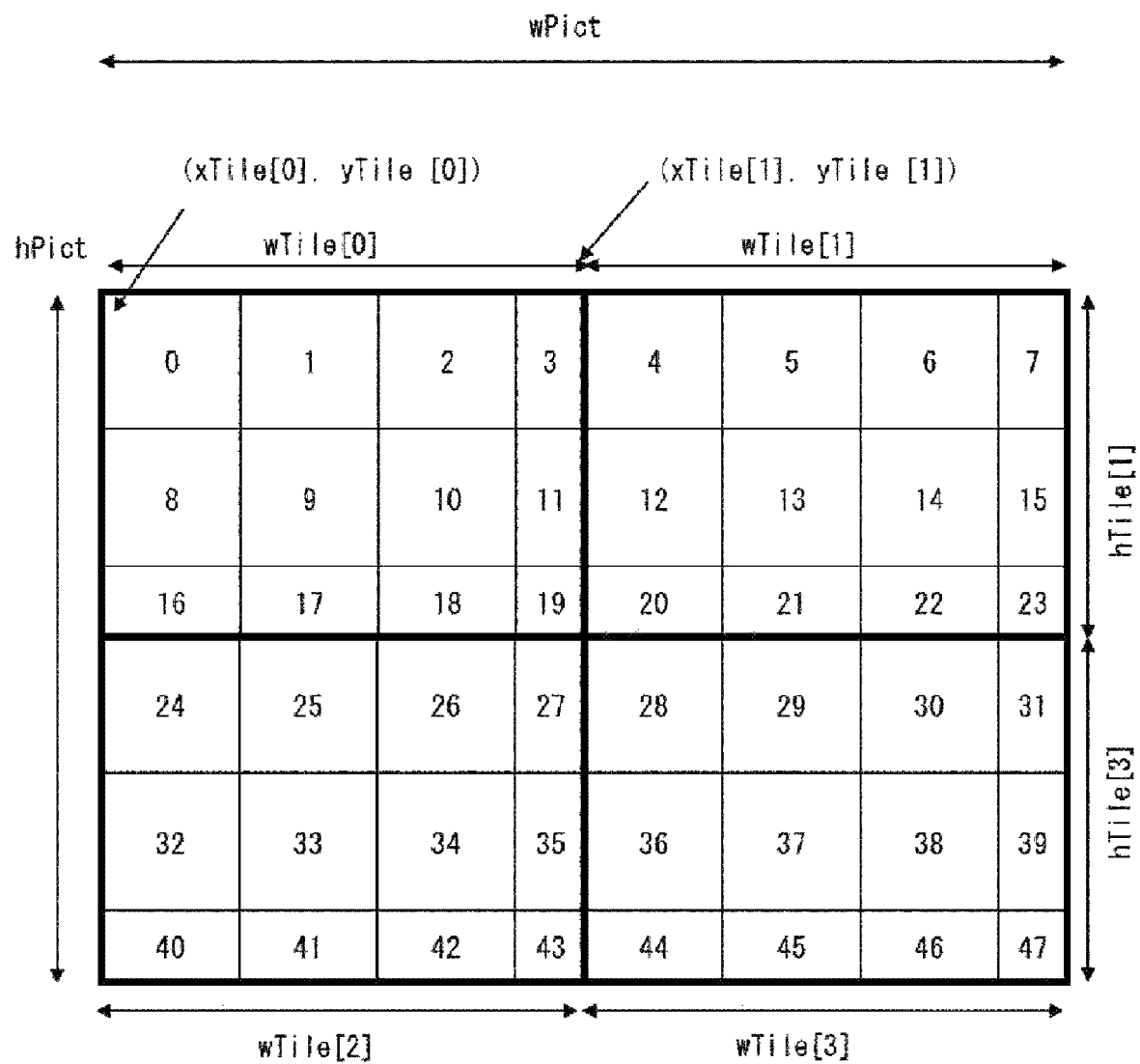
FIG. 9 is a diagram illustrating tile splitting in a non-CTU size.

FIG. 9 is a diagram illustrating a case that each tile is further split into the CTUs. In the figure, while the picture is split into 2×2 tiles, each tile is further split into the CTUs. In the present embodiment, as illustrated in the figures, in splitting each tile into the CTUs, the splitting is performed to start the CTU from the upper left of the tile. Accordingly, the tile may terminate at a position other than an integer multiple of the CTU size on the right and bottom sides, but a CTU boundary and tile boundary coincide on the left and upper sides of the tile.

Coding Tree Unit

In FIG. 1(e), a set of data referred to by the video decoding apparatus 31 to decode the CTU to be processed is prescribed. The CTU is split into a coding unit CU, which is a basic unit for coding processing by recursive Quad Tree split (QT split), Binary Tree split (BT split), or Ternary Tree split (TT split). The BT split and the TT split are collectively referred to as a Multi Tree split (MT split). Nodes of a tree structure obtained by the recursive quad tree split are referred to as Coding Nodes. Intermediate nodes of the quad tree, the binary tree, and the ternary tree are coding nodes, and the CTU itself is also prescribed as the highest coding node.

The CT includes, as CT information, a QT split flag (cu_split_flag) indicating whether or not to perform the QT split, a MT split mode (split_mt_mode) indicating a split method of the MT split, a MT split direction (split_mt_dir) indicating a split direction of the MT split, and a MT split type (split_mt_type) indicating a split type of the MT split. cu_split_flag, split_mt_flag, split_mt_dir, and split_mt_type are transmitted for each coding node.

In a case that cu_split_flag is 1, the coding node is split into four coding nodes (in FIG. 2(b)). In a case that cu_split_flag is 0 and that split_mt_flag is 0, the coding node is not split, and has one CU as a node (in FIG. 2(a)). The CU is an end node of the coding nodes and is not split any further. The CU is a basic unit of the coding processing.

In a case that split_mt_flag is 1, the coding node is split by the MT split as described below. For split_mt_type being 0, the coding node is horizontally split into two coding nodes in a case that split_mt_dir is 1 (in FIG. 2(d)), and the coding node is vertically split into two coding nodes in a case that split_mt_dir is 0 (FIG. 2(c)). For split_mt_type being 1, the coding node is horizontally split into three coding nodes in the case that split_mt_dir is 1 (in FIG. 2(f)), and the coding node is vertically split into three coding nodes in the case that split_mt_dir is 0 (FIG. 2(e)).

In a case that the CTU size is 64×64 pixel, a size of the CU can be any of 64×64 pixels, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, 8×8 pixels, 64×4 pixels, 4×64 pixels, 32×4 pixels, 4×32 pixels, 16×4 pixels, 4×16 pixels, 8×4 pixels, 4×8 pixels, and 4×4 pixels.

Coding Unit

As illustrated in FIG. 1(f), a set of data referred to by the video decoding apparatus 31 to decode the coding unit to be processed is defined. Specifically, the CU includes a CU header CUH, a prediction parameter, a transform parameter, a quantization transform coefficient, and the like. In the CU header, a prediction mode and the like are prescribed.

Prediction process may be performed in CU units or in sub-CU units in which the CU is further split. In a case that the sizes of the CU and the sub-CU are the same, there is one sub-CU in the CU. In a case that the CU is larger than the size of the sub-CU, the CU is split into the sub-CUs. For example, in a case that the CU is 8×8, and the sub-CU is 4×4, the CU is split into four sub-CUs including two horizontal splits and two vertical splits.

There are two types of prediction (prediction mode): intra prediction and inter prediction. The intra prediction refers to a prediction in an identical picture, and the inter prediction refers to prediction processing performed between different pictures (for example, between pictures of different display times, and between pictures of different layer images).

Transform and quantization processing is performed in CU units, but the quantization transform coefficient may be entropy coded in sub-block units such as 4×4.

Prediction Parameter

A prediction image is derived by the prediction parameters attached to the block. The prediction parameter includes a prediction parameter for the intra prediction and a prediction parameter for the inter prediction.

Configuration of Video Decoding Apparatus

Figure 5:
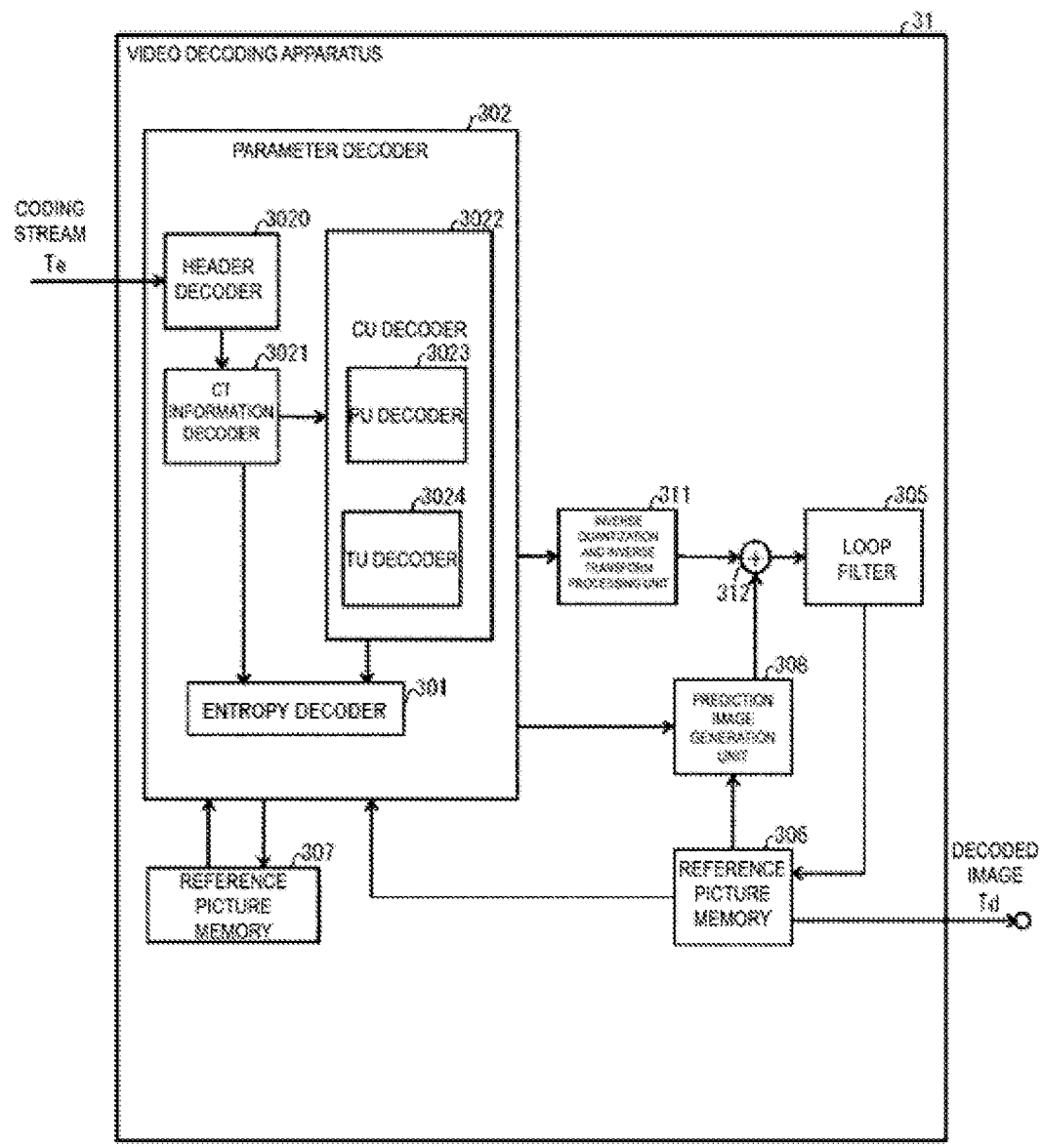
FIG. 5 is a schematic diagram illustrating a configuration of a video decoding apparatus.

A configuration of the video decoding apparatus 31 (in FIG. 5) according to the present embodiment will be described.

The video decoding apparatus 31 includes a parameter decoder (prediction image decoding apparatus) 302, a loop filter 305, a reference picture memory 306, a prediction parameter memory 307, a prediction image generation unit (prediction image generation apparatus) 308, an inverse quantization and inverse transform processing unit 311, and an addition unit 312. Note that there may be a configuration in which the video decoding apparatus 31 does not include the loop filter 305 in association with the video coding apparatus 11 described later. The parameter decoder 302 further includes an entropy decoder 301, a header decoder 3020, a CT information decoder 3021, and a CU decoder 3022 (prediction mode decoder). The CU decoder 3022 further includes a TU decoder 3024.

Decoding Module

General operation of each module will now be described. The parameter decoder 302 performs decoding processing on parameters such as header information, split information, prediction information, quantization transform coefficients, and the like.

The entropy decoder 301 decodes the syntax element from binary data. More specifically, the entropy decoder 301 decodes syntax element from the coded data by an entropy coding scheme such as CABAC, based on a syntax element supplied from sources of supply. Then, the entropy decoder 301 returns the decoded element to the sources of supply. In the example described below, the source of supply for the syntax element is the CT information decoder 3021 and the CU decoder 3022.

Basic Flow

Figure 6:
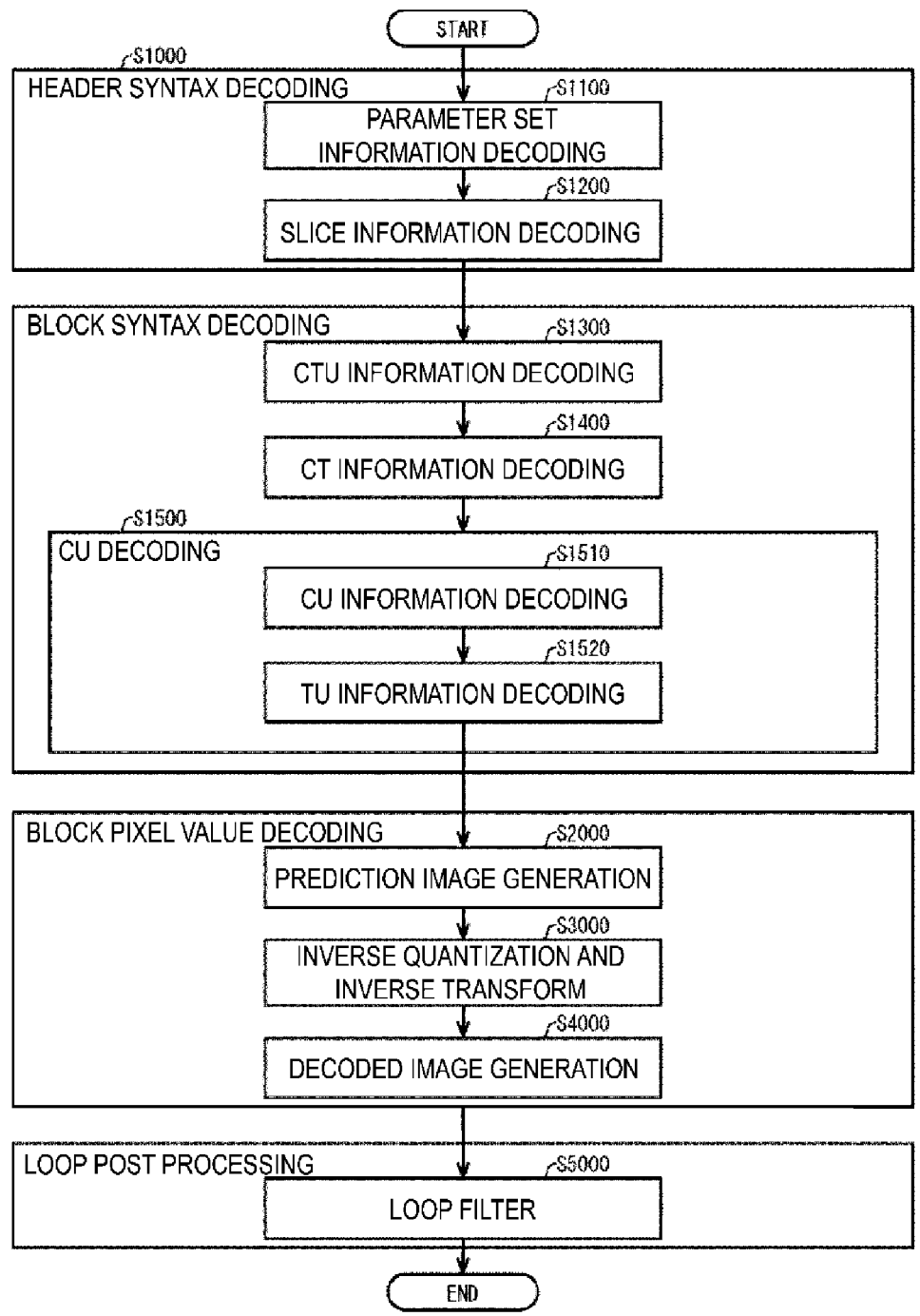
FIG. 6 is a flowchart illustrating a schematic operation of the video decoding apparatus.

FIG. 6 is a flowchart illustrating a schematic operation of the video decoding apparatus 31.

(S1100: Parameter set information decoding) The header decoder 3020 decodes parameter set information such as VPS, SPS, and PPS from the coded data.

(S1200: Slice information decoding) The header decoder 3020 decodes the slice header (slice information) from the coded data.

Hereinafter, the video decoding apparatus 31 derives the decoded image of each CTU by repeating the processes from S1300 to S5000 for each CTU included in the target picture.

(S1300: CTU information decoding) The CT information decoder 3021 decodes the CTU from the coded data.

(S1400: CT information decoding) The CT information decoder 3021 decodes the CT from the coded data.

(The S1500: CU decoding) The CU decoder 3022 performs S1510 and S1520 to decode the CU from the coded data.

(S1510: CU information decoding) The CU decoder 3022 decodes the CU information, the prediction information, the TU split flag split_transform_flag, CU residue flags cbf_cb, cbf_cr, and cbf_luma, and the like from the coded data.

(S1520: TU information decoding) The TU decoder 3024 decodes QP update information (quantization correction value) and quantization prediction residual (residual_coding) from the coded data in a case that the TU includes a prediction residual. Note that the QP update information is a value of a difference value from a quantization parameter prediction value qPpred, which is a prediction value for a quantization parameter QP.

(S2000: Prediction image generation) The prediction image generation unit 308 generates a prediction image for each block included in the target CU based on the prediction information.

(S3000: Inverse quantization and inverse transform) The inverse quantization and inverse transform processing unit 311 performs inverse quantization and inverse transform processing on each of the TUs included in the target CU.

(S4000: Decoded image generation) An adder 312 adds the prediction image supplied by the prediction image generation unit 308 to the prediction residual supplied by the inverse quantization and inverse transform processing unit 311 to generate a decoded image of the target CU.

(S5000: Loop filter) The loop filter 305 applies a loop filter such as a deblocking filter, SAO, and ALF to a decoded image, to generate the decoded image.

Decoding of CTU in Case of Tile

FIG. 10 is a diagram illustrating coding slice data. The CT information decoder 3021 in the parameter decoder 302 sequentially processes the CTUs constituting the slice (tile). Furthermore, the CT information decoder 3021 uses a target CTU coordinate derivation unit (not illustrated) to derive upper left coordinates (xCtb, yCtb) of the target CTU with reference to CTU address tables CtbAddrToCtbX[ ] and CtbAddrToCtbY[ ] from a CTU raster scan address CtbAddrInRs of the target CTU.

$$xCtb=CtbAddrToCtbX[CtbAddrInRs]$$

$$yCtb=CtbAddrToCtbY[CtbAddrInRs]$$

The CT information decoder 3021 decodes a coding tree coding_quadtree (xCtb, yCtb, log 2CbSize, cqtDepth) rooting in the target CTU from the coded data by recursive processing.

Here, CtbAddrToCtbX and CtbAddrToCtbY represent the tables derived by a CTU address table deriving unit. The parameter decoder 302 decodes a flag end_of_slice_segment_flag indicating an end of a slice segment or not, and increments the CTU address CtbAddrInTs by one (CtbAddrInTs++) for preparing for processing the next CTU to derive a subsequent CTU address. Furthermore, a CTU raster scan address corresponding to the subsequent CTU is derived (CtbAddrInRs=CtbAddrTsToRs[CtbAddrInTs]). Here, CtbAddrInTs is a tile scan address of the target CTU.

In a case that it is not the terminal of the slice segment (!end_of_slice_segment_flag), the tile is enabled (tiles_enabled_flag), and a tile ID of the subsequent CTU (TileId [CtbAddrInTs] or TildIdTbl[CtbAddrInTs]) is different from a CTU tile ID of the target CTU ([CtbAddrInTs−1]), the parameter decoder 302 decodes end_of_subset_one_bit, and further decodes a bit for byte alignment (byte_alignment( )).

Further, the parameter decoder 302 may correspond to a wave front that performs parallel processing in CTU line units in addition to the tile, and may decode end_of_subset_one_bit and further decode the bit for byte alignment (byte_alignment( )) in a case that a wave front flag entropy_coding_sync_enabled_flag is 1 and the subsequent CTU is at the beginning of the CTU line (CtbAddrInRs % PicWidthInCtbsY==0).

Note that conditions for decoding end_of_subset_one_bit and byte alignment( ) may be conditions illustrated in FIG.

16(*a*). In other words, in the case that it is not an end of the slice segment (!end_of_slice_segment_flag) and the tile is enabled (tiles_enabled_flag), the parameter decoder 302 decodes end_of_subset_one_bit and byte_alignment( ).

Here, the present embodiment is characterized in a method for deriving PicWidthInCtbsY in the case of a tile having a size not limited to an integer multiple of the CTU size. PicWidthInCtbsY means what number of CTUs are included in the width of the picture; however, in the case that the size of the effective area of the tile is not limited to the maximum CTU size or an integer multiple of the CTU size as in the present embodiment, there exist multiple CTUs each having the size with the effective area being less than the maximum CTU size or the CTU size, and thus, the value of PicWidthInCtbsY is not always equal to ceil(wPict/ctuWidth). As described above, the parameter decoder 302 according to the present embodiment derives PicWidthInCtbsY in the following manner.

for (PicWidthInCtbsY=0, i=0; i<=num_tile_columns_minus1; i++)

PicWidthInCtbs$Y$+=tileWidthInCtus[$i$]

The same is applied to PicHeightInCtbsY and is derived in the following manner.

for (PicHeightInCtbsY=0, j=0; j<=num_tile_rows_minus1; j++)

PicHeightInCtbs$Y$+=tileHeightInCtus[$j$]

In the case that the tile is limited to an integer multiple of the CTU size, the derivation may be made in the following manner.

PicWidthInCtbs$Y$=Ceil($w$Pict/ctuWidth)

PicHeightInCtbs$Y$=Ceil($h$Pict/ctuHeight)

Here, a division (/) is at a fractional pixel precision (fractional precision).

CTU Address Table Deriving Unit

The CTU address table deriving unit derives the CTU address tables CtbAddrToCtbX[ ] and CtbAddrToCtbY[ ] deriving the CTU coordinates (xCtb, yCtb) from the CTU raster scan address (CtbAddrInRs) in accordance with steps below.

Step 1

Derive the tile ID (TileId) from the CTU raster scan address CtbAddrInRs of the target CTU.

TileId=CtbAddrRsToTileID[CtbAddrInRs]

where CtbAddrRsToTileID represents a table derived by a tile ID table deriving unit.

Step 2

The CTU address table deriving unit derives a first CTU raster scan address firstCtbAddrInRs[TileId] of the tile that includes the target CTU, and uses the number PicWidthInCtbsY of CTUs included in the width of the picture to derive intra-tile coordinates (intra-tile relative positions; (xCtbInCtus, yCtbInCtus)) in units of CTU in accordance with the following equations.

$x$CtbInCtus=(CtbAddrInRs−firstCtbAddrInRs[TileId]) % PicWidthInCtbs$Y$ $y$CtbInCtus=(CtbAddrInRs−firstCtbAddrInRs[TileId])/PicWidthInCtbs$Y$ where firstCtbAddrInRs represents a table deriving a first CTU raster scan address of the tile indicated by the tile ID, which is derived by a first tile address deriving unit.

The CTU address table deriving unit multiplies by the CTU size (ctuWidth, ctuHeight) to derive intra-tile coordinates (xCtbInTile, yCtbInTile) in units of pixel in accordance with the following equations.

$x$CtbInTile=$x$CtbInCtus*ctuWidth $y$CtbInTile=$y$CtbInCtus*ctuHeight

Note that the derivation may be made using logarithmic expression of the CTU size as described below.

$x$CtbInTile=$x$CtbInCtus<<Ctb Log 2Size$Y$ $y$CtbInTile=$y$CtbInCtus<<Ctb Log 2Size$Y$ Step 3

The CTU address table deriving unit derives upper left coordinates (xCtb, yCtb) of the CTU in the picture from a sum of the intra-tile coordinates (xCtbInTile, yCtbInTile) and the intra-picture coordinates (xTile[TileId], yTile[TileId]) at the upper left of the tile.

$x$Ctb=$x$Tile[TileId]+$x$CtbInTile $y$Ctb=$y$Tile[TileId]+$y$CtbInTile

Step 4

The CTU address table deriving unit stores the upper left coordinates (xCtb, yCtb) of the CTU for the last derived CtbAddrInRs in the table.

CtbAddrToCtb$X$[CtbAddrInRs]=$x$Ctb

CtbAddrToCtb$Y$[CtbAddrInRs]=$y$Ctb

The above process can also be expressed using the position (xTileInCtus, yTileInCtu) of the CTU at the upper left of the tile as follows.

$x$TileInCtus=firstCtbAddrInRs[TileId] % PicWidthInCtbs$Y$ $y$TileInCtus=firstCtbAddrInRs[TileId]/ PicWidthInCtbs$Y$ $x$Ctb=(((CtbAddrInRs−$x$TileInCtus) % tileWidthInCtus[TileId])<<log 2CtuWidth$Y$)+$x$Tile[TileId]

$y$Ctb=(((CtbAddrInRs−$y$TileInCtus)/tileWidthInCtus[TileId])<<log 2CtuHeight$Y$)+$y$Tile[TileId]

where log 2CtuWidthY=log 2(ctuWidth) and log 2CtuHeightY=log 2(ctuHeight). Since the position (xTileInCtus, yTileInCtu) of the CTU at the upper left of the tile and the upper left coordinates (xCtb, yCtb) of the CTU are often referred to, the derived values may be stored in the table and used. The above derivation may also be performed each time the reference is made.

The entire processing described above is expressed by a pseudo-code as follows.

for (CtbAddrInRs=0; CtbAddrInRs<numCtusInFrame; CtbAddrInRs++)
{
TileId=CtbAddrRsToTileID[CtbAddrInRs]
xCtb=xTile[TileId]+((CtbAddrInRs−firstCtbAddrInRs[TileId])% PicWidthInCtbsY)*ctuUWidth
yCtb=yTile[TileId]+((CtbAddrInRs−firstCtbAddrInRs[TileId])/PicWidthInCtb sY)*ctuHeight
CtbAddrToCtbX[CtbAddrInRs]=xCtb
CtbAddrToCtbY[CtbAddrInRs]=yCtb
}
} PS where numCtusInFrame represents the number of CTUs in one picture and numCtusInFrame=numTileColumns*numTileRows.

Decoding Modification Example of CTU in Case of Tile

In the method of decoding the CTU of the tile described above, another method may be used for deriving xCtb and the yCtb without using the CTU address tables CtbAddrToCtbX[ ] and CtbAddrToCtbY[ ]. Next, an example of that method will be described.

The CT information decoder 3021 uses the target CTU coordinate deriving unit (not illustrated) to derive rx and ry from the CTU raster scan address CtbAddrInRs of the target CTU, rx being a X coordinate of the target CTU in CTU units (col position of the CTU), ry being a Y coordinate of the target CTU in CTU units (row position of the CTU), to derive upper left coordinates (xCtb, yCtb) of the target CTU with reference to CTU coordinate transform tables CtbColToCtbX[ ] and CtbRowToCtbY[ ].

$$rx = \text{CtbAddrInRs \% PicWidthInCtbs}Y$$

$$ry = \text{CtbAddrInRs/PicWidthInCtbs}Y$$

$$x\text{Ctb} = \text{CtbColToCtb}X[rx]$$

$$y\text{Ctb} = \text{CtbRowToCtb}Y[ry]$$

coding_tree_unit( ) in FIG. 19(a) is an example of syntax using the derivation method of this modification example. The upper left coordinates (xCtb, yCtb) of the target CT are derived using the CTU coordinate transform tables, and the upper left coordinates (xCtb, yCtb) are passed to coding_quadtree( ). As illustrated in FIG. 19(b), the derivation method may be changed depending on a case that a tile is available (tile_enabled_flag is true) or not.

CTU Coordinate Transform Table Deriving Unit

The CTU coordinate transform table deriving unit derives the CTU coordinate transform tables CtbColToCtbX[ ] and CtbRowToCtbY[ ] deriving the coordinates (xCtb, yCtb) of the CTU in units of pixel from the X coordinate in CTU units and the Y coordinate in CTU units (rx, ry), by the following steps.

The CTU coordinate transform table deriving unit loops the X coordinate rx in CTU units from 0 to num_tile_columns_minus1, and performs the following steps.

Step 1x

The CTU coordinate transform table deriving unit derives the tile ID from the X coordinate rx in CTU units. At this time, since this table is the same for all Y coordinates, the Y coordinate in CTU units (row position of the CTU) is 0. Accordingly, TileId=CtbAddrRsToTileID[rx]
where CtbAddrRsToTileID represents a table derived by the tile ID table deriving unit.

Step 2x

The CTU coordinate transform table deriving unit derives a first CTU raster scan address firstCtbAddrInRs[TileId] of the tile that includes the target CTU, and derives the intra-tile coordinate xCtbInCtus in units of CTU in accordance with the following equation.

$$x\text{CtbInCtus} = rx - \text{firstCtbAddrInRs[TileId] \% PicWidthInCtbs}Y$$

where firstCtbAddrInRs represents a table deriving a first CTU raster scan address of the tile indicated by the tile ID, which is derived by the first tile address deriving unit.

Alternatively, the derivation may be made using a table firstCtbCol[ ] that derives a X coordinate of a first CTB of the tile indicated by the tile ID (col position) in CTU units as follows.

$$x\text{CtbInCtus} = rx - \text{firstCtbCol[TileId]}$$

The table firstCtbCol[ ] is derived by a first tile address derivation unit as follows.

$$\text{firstCtbCol[TileId]} = \text{firstCtbAddrInRs[TileId] \% PicWidthInCtbs}Y$$

Next, the CTU coordinate transform table deriving unit multiplies xCtbInCtus by the CTU size ctuWidth to derive the intra-tile coordinate xCtbInTile in units of pixel in accordance with the following equation.

$$x\text{CtbInTile} = x\text{CtbInCtus} * \text{ctuWidth}$$

Step 3x

The CTU coordinate transform table deriving unit derives the upper left X coordinate xCtb of the CTU in the picture from a sum of the intra-tile X coordinate xCtbInTile and the intra-picture coordinate xTile[TileId] of the upper left X coordinate of the tile.

$$x\text{Ctb} = x\text{Tile[TileId]} + x\text{CtbInTile}$$

Step 4x

Finally, the CTU coordinate transform table deriving unit stores the upper left X coordinate xCtb of the CTU for the derived rx in the table.

$$\text{CtbColToCtb}X[rx] = x\text{Ctb}$$

The above process can also be expressed using the X coordinate xTileInCtus of the CTU at the upper left of the tile as follows.

$$x\text{TileInCtus} = \text{firstCtbAddrInRs[TileId] \% PicWidthInCtbs}Y$$

$$x\text{Ctb} = ((rx - x\text{TileInCtus}) << \log 2\text{CtuWidth}Y) + x\text{Tile[TileId]}$$

where log 2CtuWidthY=log 2(ctuWidth). Since the X coordinate xTileInCtus of the CTU at the upper left of the tile and the upper left X coordinate xCtb of the CTU are often referred to, the derived values may be stored in the table in this way or the above derivation may be performed each time the reference is made.

The entire processing described above is expressed by a pseudo-code as follows.

```
for (col=0; col<=num_tile_columns_minus1; col++)
{
TileId=CtbAddrRsToTileID[col]
xCtb=xTile[TileId]+((rx−firstCtbAddrInRs[TileId])%
   PicWidthInCtbsY)*ctuWidth CtbColToCtbX[col]=xCtb
}
}
```

Similar to the table for the X coordinate, the CTU coordinate transform table deriving unit loops the Y coordinate ry in CTU units from 0 to num_tile_rows_minus1, and performs the following steps.

Step 1y

The CTU coordinate transform table deriving unit derives the tile ID from the Y coordinate ry in CTU units. At this time, since this table is the same for all X coordinates, the X coordinate in CTU units (col position of the CTU) is 0. Accordingly, TileId=CtbAddrRsToTileID[ry*PicWidthInCtbsY]
where CtbAddrRsToTileID represents a table derived by the tile ID table deriving unit.

Step 2y

The CTU coordinate transform table deriving unit derives a first CTU raster scan address firstCtbAddrInRs[TileId] of the tile that includes the target CTU, and derives the intra-tile coordinate yCtbInCtus in units of CTU in accordance with the following equation.

yCtbInCtus=ry−firstCtbAddrInRs[TileId]/PicWidthInCtbsY where firstCtbAddrInRs represents a table deriving a first CTU raster scan address of the tile indicated by the tile ID, which is derived by the first tile address deriving unit.

Alternatively, the derivation may be made using a table firstCtbRow[ ] that derives a Y coordinate of a first CTB of the tile indicated by the tile ID (row position) in CTU units as follows.

yCtbInCtus=ry−firstCtbRow[TileId]

The table firstCtbRow[ ] is derived by the first tile address derivation unit as follows.

firstCtbRow[TileId]=firstCtbAddrInRs[TileId]/PicWidthInCtbsY

Next, the CTU coordinate transform table deriving unit multiplies yCtbInCtus by the CTU size ctuHeight to derive the intra-tile coordinate yCtbInTile in units of pixel in accordance with the following equation.

yCtbInTile=yCtbInCtus*ctuHeight

Step 3y

The CTU coordinate transform table deriving unit derives the upper left Y coordinate yCtb of the CTU in the picture from a sum of the intra-tile Y coordinate yCtbInTile and the intra-picture coordinate yTile[TileId] of the upper left Y coordinate of the tile.

yCtb=yTile[TileId]+yCtbInTile

Step 4y

Finally, the CTU coordinate transform table deriving unit stores the upper left Y coordinate yCtb of the CTU for the derived ry in the table.

CtbRowToCtbY[ry]=yCtb

The above process can also be expressed using a y position yTileInCtus of the CTU at the upper left of the tile as follows.

yTileInCtus=firstCtbAddrInRs[TileId]/PicWidthInCtbsY yCtb=((ry−yTileInCtus)<<log 2CtuHeightY)+yTile[TileId]

where log 2CtuHeightY=log 2(ctuHeight). Since the Y coordinate yTileInCtus of the CTU at the upper left of the tile and the upper left Y coordinate yCtb of the CTU are often referred to, the derived values may be stored in the table in this way or the above derivation may be performed each time the reference is made.

The entire processing described above is expressed by a pseudo-code as follows.

for (row=0; row<=num_tile_rows_minus1; row++)
{
TileId=CtbAddrRsToTileID [row*PicWidthInCtbsY]
yCtb=yTile[TileId]+((ry−firstCtbAddrInRs[TileId])/PicWidthInCtbsY)*ctuHeight
CtbRowToCtbY[row]=yCtb
}
}
Note that, because the CtbAddrInTs and CtbAddrInRs are convertible with respect to each other, a table in which the raster scan order CTU position CtbAddrInRs is used as an index in the above-described embodiments may also be configured by deriving the tile scan order CTU position CtbAddrInTs as an index and using an index at the time of reference converted to that of the tile scan order CTU position. Similarly, a table in which the tile scan order CTU position CtbAddrInTs is used as an index may also be configured by deriving the raster scan order CTU position CtbAddrInRs as an index and using an index at the time of reference converted to that of the raster scan order CTU position.

An example of deriving a table CtbAddrRsToTs[ ] for deriving the tile scan order CTU address from the raster scan order CTU address is expressed below by a pseudo-code. CtbAddrRsToTileId[ ] represents a tile ID table deriving a tile ID from the raster scan order CTU address that is derived by the tile ID table deriving unit.

for      (ctbAddrRs=0;       ctbAddrRs<numCtusInFrame; ctbAddrRs++) {
tileId=CtbAddrRsToTileId[ctbAddrRs]
tbX=ctbAddrRs % PicWidthInCtbsY
tbY=ctbAddrRs/PicWidthInCtbsY
CtbAddrRsToTs[ctbAddrRs]=0
for (t=0; t<tileId; t++) {
CtbAddrRsToTs[ctbAddrRs]+=TileWidthInCtbsY[tileId]
  *TileHeightInCtbsY[tileId]
CtbAddrRsToTs[ctbAddrRs]+=(tbY−TileYInCtbsY[tileId])
  *TileWidthInCtbsY[tileId]
+tbX−TileXInCtbsY[tileId]
}

According to the configuration described above, the video decoding apparatus, which splits an image into the CTUs and decodes a video in CTU units, includes the CT information decoder that splits the tile into the CTUs to recursively split, and the header decoder (target CTU coordinate deriving unit) that refers to the size of one or more tiles from the raster scan address of the target CTU to derive the upper left coordinates of the target CTU on the picture, wherein the CT information decoder includes means that splits the target CTU into coding trees based on the upper left coordinates of the derived CTU on the picture, and processes each of the coding trees in a case that intra-tile coordinates at lower right position of the split CT is within the tile size.

The video decoding apparatus, which splits an image into tiles and decodes a video in tile units, includes the header decoder (target CTU coordinate deriving unit) that refers to the CTU address table deriving the upper left coordinates of the target CTU from the raster scan address of the target CTU, and the header decoder (CTU address table deriving unit) that derives the CTU address table from the size of one or more tiles.

Tile ID Table Deriving Unit

The tile ID table deriving unit derives the tile ID table CtbAddrRsToTileID[ ] in the following steps.

Step 1

Derive tile coordinates (columnIdx, rowIdx) of the CTU corresponding to the CTU address CtbAddrInRs in the picture.

Step 2

Derive a tile ID in the picture from the tile coordinates (columnIdx, rowIdx).

TileId=rowIdx*numTileColumns+columnIdx where numTileColumns represents the number of tiles in the picture in the horizontal direction.

Step 3

Store the derived tile ID in the tile ID table CtbAddrRsToTileID[ ].

CtbAddrRsToTileID[CtbAddrInRs]=TileId

The entire processing described above is expressed by a pseudo-code as follows.

```
for (CtbAddrInRs=0; CtbAddrInRs<numCtusInFrame; CtbAddrInRs++)
{
for (col=0; col<numTileColumns; col++)
{
if(CtbAddrInRs % PicWidthInCtbsY<=rightEdgePosInCtus
   [col])
{
columnIdx=col
break
}
}
for (row=0; row<numTileRows; row++)
{
if(CtbAddrInRs/PicWidthInCtbsY<=bottomEdgePosInCtus
   [row*numTileColumns])
{
rowIdx=row
break
}
}
CtbAddrRsToTileID[CtbAddrInRs]
   =rowIdx*numTileColumns+columnIdx
}
```

Lead Tile Address Derivation Unit

The first tile address derivation unit derives the first tile address table firstCtbAddrInRs[ ] in the following steps.

Step 1

For TileId corresponding to the coordinates (col, row) in tile units, refer to the width tileWidthInCtus[i] of each tile i (0<=i<col) in CTU units until the col column to derive a right end position rightEdgePosInCtus[TileId] of the tile indicated by TileId in CTU units, Similarly, refer to the height tileHeightInCtus[j] of each tile j (0<=j<row) in CTU units until the row column to derive a lower end position bottomEdgePosInCtus[TileId] of the tile indicated by TileId in CTU units.

Step 2

Derive the left end position xCtbInCtus of the tile indicated by TileId in CTU units from the right end position rightEdgePosInCtus[TileId] of the tile indicated by TileId in CTU units and the width tileWidthInCtus[TileId] of the tile indicated by TileId in CTU units.

Derive the upper end position yCtbInCtus of the tile indicated by TileId in CTU units from the lower end position bottomEdgePosInCtus[TileId] of the tile indicated by TileId in CTU units and the height tileHeightInCtus[TileId] of the tile indicated by TileId in CTU units.

xCtbInCtus=rightEdgePosInCtus[TileId]−
tileWidthInCtus[TileId]+1 yCtbInCtus=bottomEdgePosInCtus[TileId]−tile-
HeightInCtus[TileId]+1

Derive the CTU raster scan address CtbAddrInRs from a position (xCtbInCtus, yCtbInCtus) of an upper left pixel of tile indicated by TileId in CTU units in the picture.

CtbAddrInRs=yCtbInCtus*PicWidthInCtbsY+xCt-
bInCtus where tileWidthInCtus[ ] and tileHeightInCtus[ ] are derived by the tile information configuration unit.

Step 3

Store the derived CTU address in the first tile address table firstCtbAddrInRs[ ].

firstCtbAddrInRs[TileId]=CtbAddrInRs

The entire processing described above is expressed by a pseudo-code as follows.

```
for (row=0; row<numTileRows; row++)
{
for (col=0; col<numTileColumns; col++)
{
TileIdx=row*numTileColumns+col;
rightEdgePosInCTU=0;
for (i=0; i<=col; i++)
{
rightEdgePosInCTU+=tileWidthInCtus
   [row*numTileColumns+i]
}
rightEdgePosInCtus[TileId]=rightEdgePosInCTU−1
bottomEdgePosInCTU=0;
for (i=0; i<=row; i++)
{
bottomEdgePosInCTU+=tileHeightInCtus
   [i*numTileColumns+col]
}
bottomEdgePosInCtus[tileId]=bottomEdgePosInCTU−1
xCtbInCtus=rightEdgePosInCtus[TileId]−tileWidthInCtus
   [TileId]+1
yCtbInCtus=bottomEdgePosInCtus[TileId]−tileHeightInC-
   tus[TileId]+1
CtbAddrinRs=yCtbInCtus*PicWidthlnCtbsY+xCtbInCtus
firstCtbAddrInRs[TileId]=CtbAddrinRs
}
}
```

CT Information Decoding Processing

Figure 7:
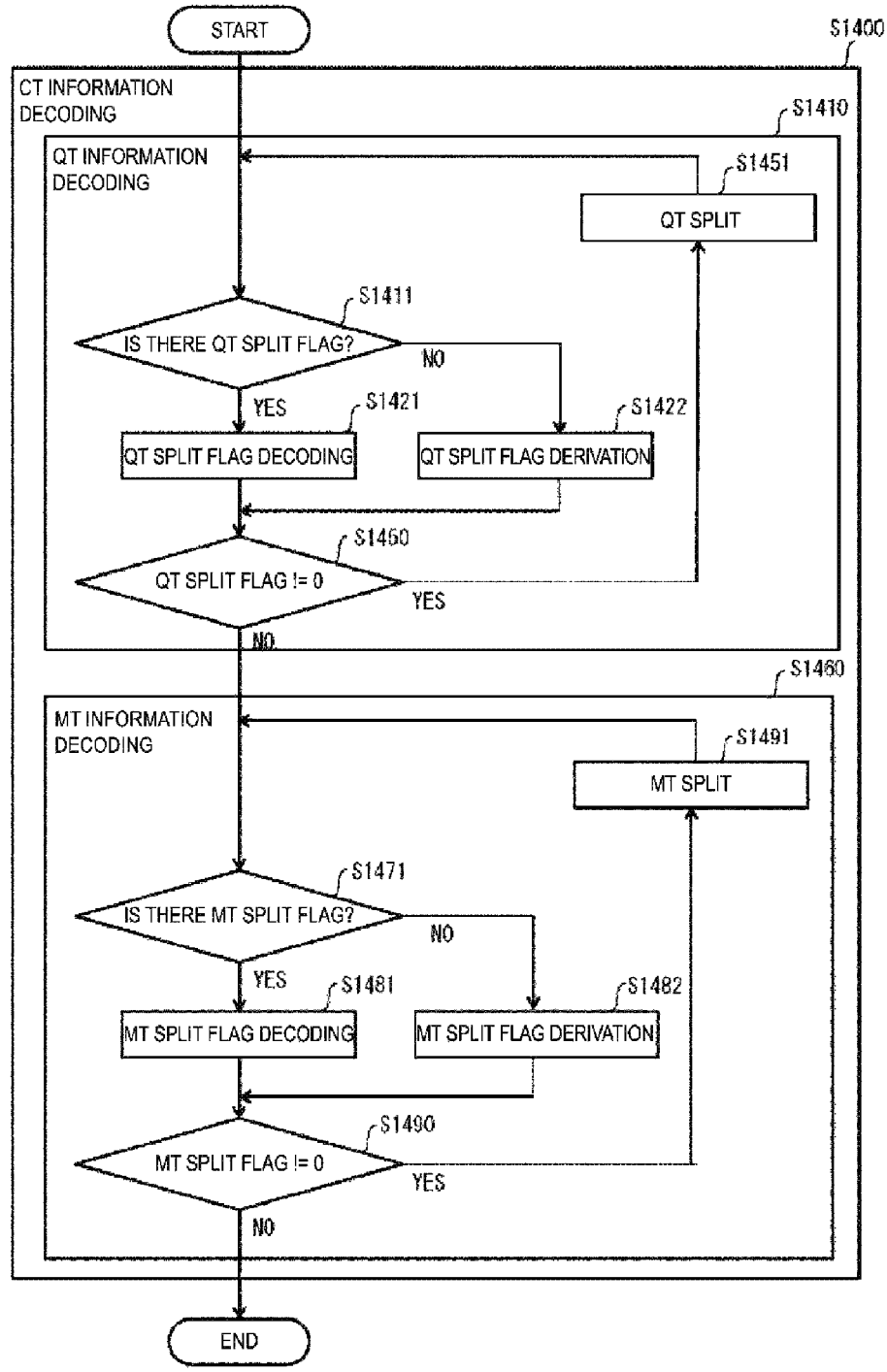
FIG. 7 is a flowchart illustrating an operation of a CT information decoder.

Hereinafter, the processing of CT information decoding will be described below with reference to FIG. 7, and FIG. 16 to FIG. 18. FIG. 7 is a flowchart illustrating operations of the CT information decoder 3021 according to one embodiment of the present invention. FIG. 16 to FIG. 18 are diagrams illustrating configuration examples of syntax tables of slice segment, CTU, QT information, and MT split information according to one embodiment of the present invention.

In the syntax decoding of the coding_tree_unit( ), CT information decoding derives the upper left coordinates (xCtb, yCtb) of the target CTU and recursively decodes the syntax of coding_quadtree( ). The upper left coordinates (xCtb, yCtb) of the CTU is used for an initial value of the upper left coordinates (xCb, yCb) of the CT of coding_quadtree( ). As another method of deriving (xCtb, yCtb), the derivation method may be changed depending on a case that a tile is used (tile_enabled_flag is true) or not, as illustrated in FIG. 16(b). That is, in a case that the tile is used, the CTU upper left coordinates (xCtb, yCtb) are derived from the sum of the tile upper left coordinates (xTile[TileId], yTile[TileId]) in the picture and the CTU upper left coordinates in the tile. That is, the CTU upper left coordinates in the tile derives the intra-tile coordinates in CTU units from a difference between the intra-picture coordinates (rx, ry) of CTU in CTU units and the intra-picture coordinates (TileXInCtbY, TileYInCtbY) of the tile in CTU units, and multiplies by the CTU size (left-shifting by Ctb Log 2SizeY).

CurrTileId=TileIdTbl[CtbAddrInRs]

xCtb=xTile[TileId]+(rx−TileXInCtbsY[CurrTileId])<<Ctb Log 2SizeY yCtb=yTile[TileId]+(ry−TileYInCtbsY[CurrTileId])<<Ctb Log 2SizeY Conversely, in a case that the tile is not used, the CTU upper left coordinates (xCtb, yCtb) are derived from the intra-picture coordinates of the CTU in CTU units. That is, the CTU upper left coordinate in the tile is derived by multiplying the intra-picture coordinates (rx, ry) of the CTU in CTU units by the CTU size (left-shifting by Ctb Log 2SizeY).

rx=CtbAddrInRs % PicWidthInCtbsY ry=CtbAddrInRs/PicWidthInCtbsY xCtb=rx<<Ctb Log 2SizeY yCtb=ry<<Ctb Log 2SizeY Decoding of CTU and Below Units The CT information decoder 3021 decodes the CT information from coded data to recursively decodes the coding tree CT (coding_quadtree). Specifically, the CT information decoder 3021 decodes the QT information to decode a target CT coding_quadtree(x0, y0, log 2CbSize, cqtDepth). Note that (x0, y0) represent upper left coordinates of a target CT, log 2CbSize represents a logarithm CT size that is a logarithm of the CT size as a size of the CT to the base 2, and cqtDepth represents a CT depth (QT depth) indicating a hierarchy of the CT.

(S1411) The CT information decoder 3021 determines whether or not the decoded CT information includes a QT split flag. In a case that a QT split flag is included, the process proceeds to S1421 and otherwise to S1422.

(S1421) In a case that the CT information decoder 3021 determines that the logarithm CT size log 2CbSize is larger than MinCbLog 2SizeY, the CT information decoder 3021 decodes the QT split flag (split_cu_flag). Here, as described by equations below, in the case that the tile is used, in consideration of the upper left coordinates (xCtb, yCtb) of the CTU and the tile size, split_cu_flag indicating whether or not to further perform a quad tree split is notified.

if (x0+(1<<log 2CbSize)−xTile<=wT && y0+
  (1<<log 2CbSize)−yTile<=hT && log
  2CbSize>MinCb Log 2SizeY)

split_cu_flag[x0][y0]

where (x0, y0) represent upper left coordinates of the block, (xTile, yTile) represent upper left coordinates of the tile, log 2CbSize represents a logarithmic value of the block size, wT and hT represent a width and height of the tile effective area (or tile coding area), respectively, and MinCbLog 2SizeY represents a logarithmic value of a minimum size of the block.

In a case that a right end coordinate x0+(1<<log 2CbSize) and a lower end coordinate y0+(1<<log 2CbSize) of the block are smaller than a right end coordinate xTile+wTile and a lower end coordinate yTile+hTile of the tile effective area, the target block is within the tile effective area. In a case that the block is within the tile and the block size is greater than the minimum value (log 2CbSize>MinCbLog 2SizeY), a flag split_cu_flag indicating whether or not to further split the block is notified. In a case that the block is further split by quad tree split, split_cu_flag is set to 1, and in a case that the block is not split by quad tree split, split_cu_flag is set to 0.

(S1422) In other cases, the CT information decoder 3021 omits decoding of the QT split flag split_cu_flag from the coded data, and set the QT split flag split_cu_flag to 0.

(S1450) In a case that the QT split flag split_cu_flag is other than 0, the process proceeds to S1451, otherwise to S1471.

(S1451) The CT information decoder 3021 performs the QT split. Specifically, the CT information decoder 3021 decodes four CTs of a logarithm CT size log 2CbSize−1, at positions of a CT depth cqtDepth+1 (x0, y0), (x1, y0), (x0, y1), and (x1, y1). A CT, of the CTs in the tile, having the lower right coordinates (xi−xTile[TileId], yi−yTile[TileId]) less than the tile size (wTile[TileId], hTile[TileId]) is decoded. Conversely, any CT having the lower right coordinates (xi−xTile[TileId], yi−yTile[TileId]) equal to or greater than the tile size (wTile[TileId], hTile[TileId]) is not decoded. In other words, the CT information decoder 3021 recursively splits the target CTU into the coding trees, and processes the coding tree in the case that the upper left coordinates (x1, y0), (x0, y1), (x1, y1) of the split CT are within the target tile.

Also in lower CTs, the CT information decoder 3021 continues the QT information decoding starting from S1411, by using the updated upper left coordinates, logarithm CT size, and CT depth.

After the QT split completes, the CT information decoder 3021 decodes the CT information from the coded data, and recursively decodes the coding tree CT (MT, coding_multitree). Specifically, the CT information decoder 3021 decodes the MT split information to decode the target CT coding_multitree (x0, y0, log 2CbWidth, log 2CbHeight, cbtDepth). Note that log 2CbWidth represents a logarithmic value of the CT width, log 2CbHeight represents a logarithm value of the CT height, and cbtDepth represents a CT depth (MT depth) indicating a hierarchy of the multi-tree.

(S1471) The CT information decoder 3021 determines whether or not the decoded CT information includes a MT split flag (split information). In a case that the MT split flag is included, the process proceeds to S1481. In other cases, the process proceeds to S1482.

(S1481) The CT information decoder 3021 decodes the MT split flag split_mt_flag.

(S1482) The CT information decoder 3021 does not decode the MT split flag split_mt_flag from the coded data and sets the flag to 0.

(S1490) In a case that the MT split flag split_mt_flag is other than 0, the CT information decoder 3021 transitions the process to S1491. In other cases, the CT information decoder 3021 does not split the target CT and terminates the process (transitions to the CU decoding).

(S1491) The CT information decoder 3021 performs the MT split. Decode the flag split_mt_dir indicating the MT split direction, and the syntax element split_mt_type indicating whether the MT split is a binary tree or a ternary tree. In a case that upper left coordinates of the split CT are within the target tile, the CT information decoder 3021 processes the coding tree The upper left coordinates of the CT are (x0, y1) or (x1, y0) for the binary tree, and (x0, y1), (x0, y2) or (x1, y0), (x2, y0) for the ternary tree. Here, since the split itself is not performed in a case that the upper left coordinates (x0, y0) of the first CT are without the tile, (x0, y0) is assumed to be always within the tile.

Also in lower CTs, the CT information decoder 3021 continues the BT split information decoding or TT split information decoding starting from S1471, by using the updated upper left coordinates, the CT width and height, and MT depth.

In a case that the MT split flag split_mt_flag is 0, i.e., in a case that no QT split or no MT split is performed, the CT information decoder 3021 decodes the CU (coding_unit (x0, y0, log 2CbSize, cqtDepth)) in the CU decoder 3022.

As described above, the tile upper left coordinates (xTile, yTile) are subtracted from the upper left coordinates (xi, yi) of each CU expressed in the intra-picture coordinate system to derive the upper left coordinates in the intra-tile coordinate system, and compare the derived coordinates with the tile size (wTile, yTile) to decode the split flag, and decode each CT. This has the effect that, even in a case that the tile size is not an integer multiple of the CTU size, the CU split can be efficiently performed without decoding the wasted split flag and wasted CT.

In addition, the upper left coordinates (xi, yi) of each CU expressed in the tile is compared with the tile size (wTile, yTile) to decode the split flag and decode each CT. This has the effect that, even in a case that the tile size is not an integer multiple of the CTU size, the CU split can be efficiently performed without decoding the wasted split flag and wasted CT. Furthermore, by performing the CU split using the intra-tile coordinate system, a further effect is achieved that the CU split can be performed in a simple process without performing transform from the intra-picture coordinate system to the intra-tile coordinate system.

In addition, the parameter decoder 302 includes an inter prediction parameter decoder 303 and an intra prediction parameter decoder 304, which are not illustrated in the figure. The prediction image generation unit 308 includes an inter prediction image generation unit 309 and an intra prediction image generation unit 310, which are not illustrated in the figure.

The entropy decoder 301 outputs an inter prediction parameter to the inter prediction parameter decoder 303. The entropy decoder 301 also outputs the intra prediction parameter to the intra prediction parameter decoder 304. The entropy decoder 301 outputs quantization transform coefficients to the inverse quantization and inverse transform processing unit 311.

The loop filter 305 is a filter provided in a coding loop, and removes a block distortion and a ringing distortion to improve an image quality. The loop filter 305 applies a filter such as a deblocking filter, a Sample Adaptive Offset (SAO), and an Adaptive Loop Filter (ALF) on a decoded image of a CU generated by the addition unit 312.

The reference picture memory 306 stores a decoded image of the CU generated by the addition unit 312 in a position predetermined for each target picture and each target CU.

The prediction parameter memory 307 stores the prediction parameter in a position predetermined for each CTU or CU to be decoded. Specifically, the prediction parameter memory 307 stores the parameter decoded by the parameter decoder 302, a prediction mode predMode separated by the entropy decoder 301, and the like.

The prediction image generation unit 308 receives input of the prediction mode predMode, the prediction parameter, and the like. In addition, the prediction image generation unit 308 reads a reference picture from the reference picture memory 306. The prediction image generation unit 308 uses the prediction parameters and the read out reference picture (reference picture block) to generate a prediction image of the block or sub-block in the prediction mode indicated by the prediction mode predMode. Here, the reference picture block is a set of pixels on the reference picture (the reason to be called a block is because it generally has a rectangle shape), and is an area referenced in order to generate the prediction image.

The inverse quantization and inverse transform processing unit 311 performs inverse quantization on the quantization transform coefficients input from the entropy decoder 301 to find transform coefficients. These quantization transform coefficients are coefficients obtained by performing a frequency transform such as a Discrete Cosine Transform (DCT), a Discrete Sine Transform (DST), or a Karyhnen Loeve Transform (KLT) on prediction residuals to quantize the prediction residuals in the coding processing. The inverse quantization and inverse transform processing unit 311 performs inverse frequency transform such as inverse DCT, inverse DST, and inverse KLT on the found transform coefficients to compute a prediction residual. The inverse quantization and inverse transform processing unit 311 outputs the calculated prediction residual to the addition unit 312.

The addition unit 312 adds the prediction image of the block input from the prediction image generation unit 308 to the prediction residual input from the inverse quantization and inverse transform processing unit 311 for each pixel to generate a decoded image of the block. The addition unit 312 stores the decoded image of the block in the reference picture memory 306 or outputs the decoded image to the loop filter 305.

Configuration of Video Coding Apparatus

Figure 11:
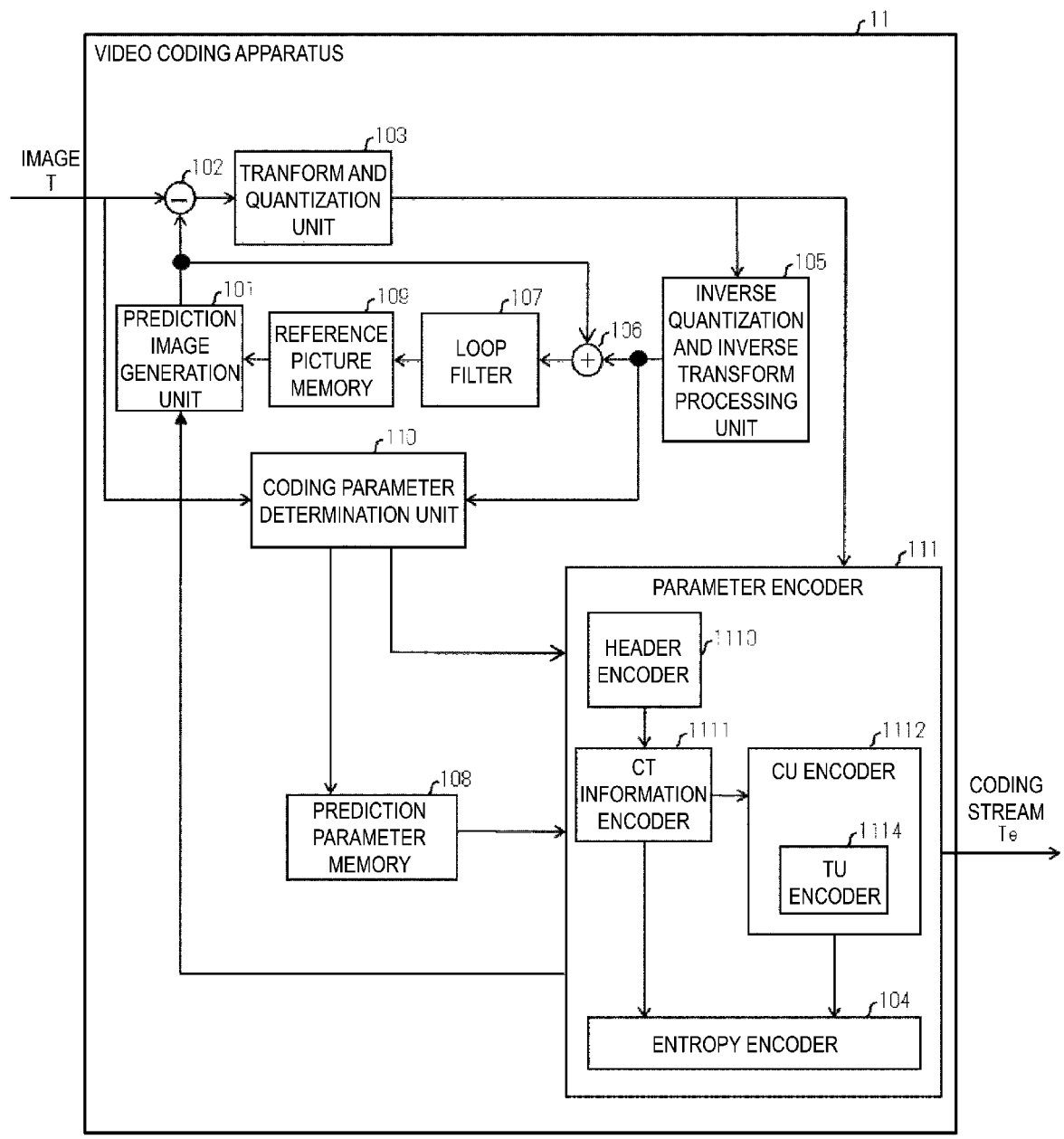
FIG. 11 is a block diagram illustrating a configuration of a video coding apparatus.

Next, a configuration of the video coding apparatus 11 according to the present embodiment will be described. FIG. 11 is a block diagram illustrating the configuration of the video coding apparatus 11 according to the present embodiment. The video coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, a parameter encoder 111, and an entropy encoder 104.

The prediction image generation unit 101 generates a prediction image for each CU that is a region obtained by splitting each picture on the image T. The operation of the prediction image generation unit 101 is the same as that of the prediction image generation unit 308 already described, and thus, the description thereof is omitted.

The subtraction unit 102 subtracts a pixel value of the prediction image of the block input from the prediction image generation unit 101 from a pixel value of an image T to generate a prediction residual. The subtraction unit 102 outputs the prediction residual to the transform and quantization unit 103.

The transform and quantization unit 103 calculates a transform coefficient by frequency transform for the prediction residual input from the subtraction unit 102 to derive a quantization transform coefficient by quantization. The transform and quantization unit 103 outputs the quantization transform coefficient to the entropy encoder 104 and the inverse quantization and inverse transform processing unit 105.

The inverse quantization and inverse transform processing unit 105 is the same as the inverse quantization and inverse transform processing unit 311 (FIG. 5) in the video decoding apparatus 31, and descriptions thereof are omitted. The calculated prediction residual is output to the addition unit 106.

The parameter encoder 111 includes a header encoder 1110, a CT information encoder 1111, a CU encoder 1112 (prediction mode encoder), an entropy encoder 104, and an inter prediction parameter encoder 112 and an intra prediction parameter encoder 113 not illustrated. The CU encoder 1112 further includes a TU encoder 1114.

General operation of each module will now be described. The parameter encoder 111 performs coding processing on parameters such as header information, split information, prediction information, quantization transform coefficients, and the like.

The CT information encoder 1111 codes QT and MT (BT, TT) split information, and the like.

The CU encoder 1112 codes the CU information, the prediction information, the TU split flag split_transform_flag, CU residue flags cbf_cb, cbf_cr, and cbf_luma, and the like.

The TU encoder 1114 codes the QP update information (quantization correction value) and the quantization prediction residual (residual_coding) in a case that the TU includes a prediction residual.

The entropy encoder 104 transforms the syntax element supplied from the source of supply into binary data, generates and outputs coded data by entropy encoding schemes such as CABAC. In the example illustrated in FIG. 11, the source of supply for the syntax element is the CT information encoder 1111 and the CU encoder 1112.

The addition unit 106 adds a pixel value of the prediction image of the block input from the prediction image generation unit 101 to a prediction residual input from the inverse quantization and inverse transform processing unit 105 for each pixel to generate a decoded image. The addition unit 106 stores the generated decoded image in the reference picture memory 109.

The loop filter 107 applies a deblocking filter, SAO, and ALF to the decoded image generated by the addition unit 106. Note that the loop filter 107 may not necessarily include three types of filters described above, and may include only the deblocking filter, for example.

The prediction parameter memory 108 stores the prediction parameters generated by the coding parameter determination unit 110 for each picture and CU to be coded at a predetermined position.

The reference picture memory 109 stores the decoded image generated by the loop filter 107 for each picture and CU to be coded at a predetermined position.

The coding parameter determination unit 110 selects one set among multiple sets of coding parameters. A coding parameter is the above-mentioned QT, BT, or TT split information, and prediction parameter, or parameters to be targets of coding generated associated with these above-mentioned prediction parameters. The prediction image generation unit 101 generates the prediction image by using these coding parameters.

The coding parameter determination unit 110 calculates, for each of the multiple sets, a RD cost value indicating the magnitude of an amount of information and a coding residual. The entropy encoder 104 outputs the selected set of coding parameters as the coding stream Te. The coding parameter determination unit 110 stores the determined coding parameters in the prediction parameter memory 108.

Note that, part of the video coding apparatus 11 and the video decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction image generation unit 101, the subtraction unit 102, the transform and quantization unit 103, the entropy encoder 104, the inverse quantization and inverse transform processing unit 105, the loop filter 107, the coding parameter determination unit 110, and the parameter encoder 111, may be realized by a computer. In that case, this configuration may be realized by recording a program for realizing such control functions on a computer-readable recording medium and causing a computer system to read the program recorded on the recording medium for execution. Note that the "computer system" mentioned here refers to a computer system built into either the video coding apparatus 11 or the video decoding apparatus 31 and is assumed to include an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system. Moreover, the "computer-readable recording medium" may include a medium that dynamically retains a program for a short period of time, such as a communication line in a case that the program is transmitted over a network such as the Internet or over a communication line such as a telephone line, and may also include a medium that retains the program for a fixed period of time, such as a volatile memory included in the computer system functioning as a server or a client in such a case. Furthermore, the above-described program may be one for realizing some of the above-described functions, and also may be one capable of realizing the above-described functions in combination with a program already recorded in a computer system.

Part or all of the video coding apparatus 11 and the video decoding apparatus 31 in the embodiments described above may be realized as an integrated circuit such as a Large Scale Integration (LSI). Each function block of the video coding apparatus 11 and the video decoding apparatus 31 may be individually realized as processors, or part or all may be integrated into processors. The circuit integration technique is not limited to LSI, and the integrated circuits for the functional blocks may be realized as dedicated circuits or a multi-purpose processor. In a case that with advances in semiconductor technology, a circuit integration technology with which an LSI is replaced appears, an integrated circuit based on the technology may be used.

The embodiment of the present invention has been described in detail above referring to the drawings, but the specific configuration is not limited to the above embodiments and various amendments can be made to a design that fall within the scope that does not depart from the gist of the present invention.

The video decoding apparatus according to an aspect of the present invention is a video decoding apparatus that splits an image into tiles, splits the tile into CTUs, and decodes a video in CTU units, the video decoding apparatus including the header decoder that configures a minimum unit for the size of the tile to be a prescribed value, and the CT information decoder that decodes the CTU from the coding stream, wherein the header decoder derives the tile upper left position and tile size using the minimum unit for size of the tile.

In the video decoding apparatus according to an aspect of the present invention, the prescribed value is a minimum CTU size.

In the video decoding apparatus according to an aspect of the present invention, the prescribed value is an integer multiple of the minimum CTU size.

In the video decoding apparatus according to an aspect of the present invention, the prescribed value is 8 or 16.

In the video decoding apparatus according to an aspect of the present invention, the prescribed value is an integer multiple of the minimum CTU size in the horizontal direction and 8 or 16 in the vertical direction.

In the video decoding apparatus according to an aspect of the present invention, the minimum unit for the size of the tile is derived using the minimum CTU size, and a difference value between the minimum unit for the tile size and the minimum CTU size.

The video coding device according to an aspect of the present invention is a video coding apparatus that splits an image into tiles, splits the tile into CTUs, and codes a video in CTU units, the video coding device including the header encoder that configures a minimum unit for the size of the tile to be a prescribed value, and the CT information encoder that codes the CTU to generate a coding stream, wherein the header encoder derives the tile upper left position and tile size using the minimum unit for size of the tile.

Application Examples

The above-mentioned video coding apparatus 11 and video decoding apparatus 31 can be utilized being installed to various apparatuses performing transmission, reception, recording, and reconstruction of videos. Note that, the video may be a natural video imaged by camera or the like, or may be an artificial video (including CG and GUI) generated by computer or the like.

Figure 12:
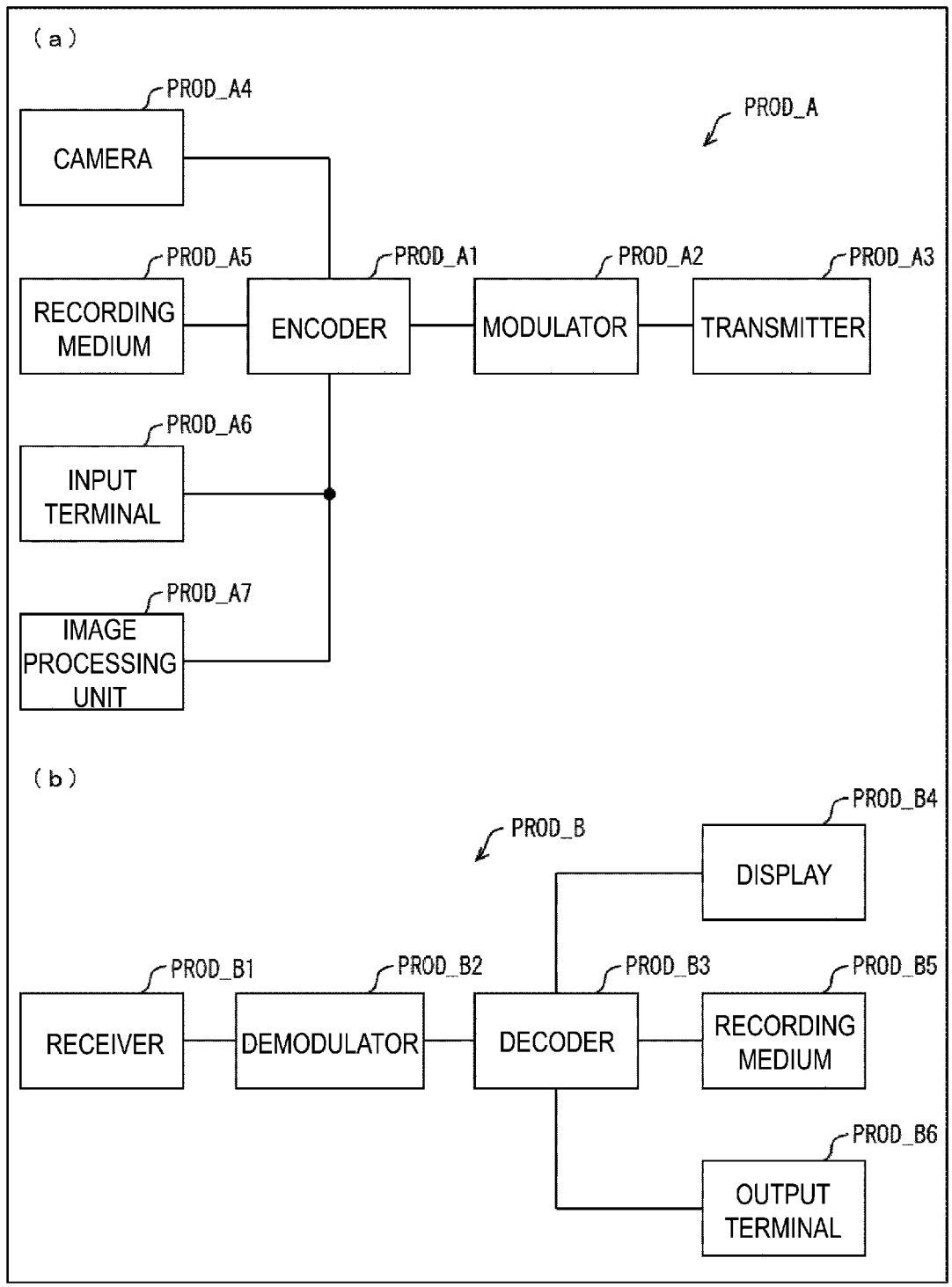
FIG. 12 is a diagram illustrating configurations of a transmitting apparatus equipped with the video coding apparatus and a receiving apparatus equipped with the video decoding apparatus according to the present embodiment. (a) illustrates the transmitting apparatus equipped with the video coding apparatus, and (b) illustrates the receiving apparatus equipped with the video decoding apparatus.

First, a description is given of that the video coding apparatus 11 and the video decoding apparatus 31 described above can be used to receive and transmit the video with reference to FIG. 12.

FIG. 12(a) is a block diagram illustrating a configuration of a transmitting apparatus PROD_A equipped with the video coding apparatus 11. As illustrated in FIG. 12(a), the transmitting apparatus PROD_A includes an encoder PROD_A1 which obtains coded data by coding videos, a modulator PROD_A2 which obtains modulation signals by modulating carrier with the coded data obtained by the encoder PROD_A1, and a transmitter PROD_A3 which transmits the modulation signals obtained by the modulator PROD_A2. The above-mentioned video coding apparatus 11 is utilized as the encoder PROD_A1.

The transmitting apparatus PROD_A may further include a camera PROD_A4 that images videos, a recording medium PROD_A5 that records videos, an input terminal PROD_A6 for inputting videos from the outside, and an image processing unit A7 which generates or processes images, as supply sources of videos to be input into the encoder PROD_A1. Although an example configuration in which the transmitting apparatus PROD_A includes all of the constituents is illustrated in FIG. 12(a), some of the constituents may be omitted.

Note that the recording medium PROD_A5 may record videos which are not coded or may record videos coded in a coding scheme for recording different from a coding scheme for transmission. In the latter case, a decoder (not illustrated) to decode coded data read from the recording medium PROD_A5 according to the coding scheme for recording may be present between the recording medium PROD_A5 and the encoder PROD_A1.

FIG. 12(b) is a block diagram illustrating a configuration of a receiving apparatus PROD_B equipped with the video decoding apparatus 31. As illustrated in FIG. 12(b), the receiving apparatus PROD_B includes a receiver PROD_B1 that receives modulation signals, a demodulator PROD_B2 that obtains coded data by demodulating the modulation signals received by the receiver PROD_B1, and a decoder PROD_B3 that obtains videos by decoding the coded data obtained by the demodulator PROD_B2. The above-mentioned video decoding apparatus 31 is utilized as the decoder PROD_B3.

The receiving apparatus PROD_B may further include a display PROD_B4 that displays videos, a recording medium PROD_B5 for recording the videos, and an output terminal PROD_B6 for outputting the videos to the outside, as supply destinations of the videos to be output by the decoder PROD_B3. Although an example configuration that the receiving apparatus PROD_B includes all of the constituents is illustrated in FIG. 12(b), some of the constituents may be omitted.

Note that the recording medium PROD_B5 may record videos which are not coded, or may record videos which are coded in a coding scheme for recording different from a coding scheme for transmission. In the latter case, an encoder (not illustrated) that codes videos acquired from the decoder PROD_B3 according to the coding scheme for recording may be present between the decoder PROD_B3 and the recording medium PROD_B5.

Note that a transmission medium for transmitting the modulation signals may be a wireless medium or may be a wired medium. In addition, a transmission mode in which the modulation signals are transmitted may be a broadcast (here, which indicates a transmission mode in which a transmission destination is not specified in advance) or may be a communication (here, which indicates a transmission mode in which a transmission destination is specified in advance). That is, the transmission of the modulation signals may be realized by any of a wireless broadcast, a wired broadcast, a wireless communication, and a wired communication.

For example, a broadcasting station (e.g., broadcasting equipment)/receiving station (e.g., television receiver) for digital terrestrial broadcasting is an example of the transmitting apparatus PROD_A/receiving apparatus PROD_B for transmitting and/or receiving the modulation signals in the wireless broadcast. In addition, a broadcasting station (e.g., broadcasting equipment)/receiving station (e.g., television receivers) for cable television broadcasting is an example of the transmitting apparatus PROD_A/receiving apparatus PROD_B for transmitting and/or receiving the modulation signals in the wired broadcast.

In addition, a server (e.g., workstation)/client (e.g., television receiver, personal computer, smartphone) for Video On Demand (VOD) services, video hosting services and the like using the Internet is an example of the transmitting apparatus PROD_A/receiving apparatus PROD_B for transmitting and/or receiving the modulation signals in communication (usually, any of a wireless medium or a wired medium is used as a transmission medium in LAN, and the wired medium is used as a transmission medium in WAN). Here, personal computers include a desktop PC, a laptop PC, and a tablet PC. In addition, smartphones also include a multifunctional mobile telephone terminal.

A client of a video hosting service has a function of coding a video imaged with a camera and uploading the video to a server, in addition to a function of decoding coded data downloaded from a server and displaying on a display.

Thus, the client of the video hosting service functions as both the transmitting apparatus PROD_A and the receiving apparatus PROD_B.

Figure 13:
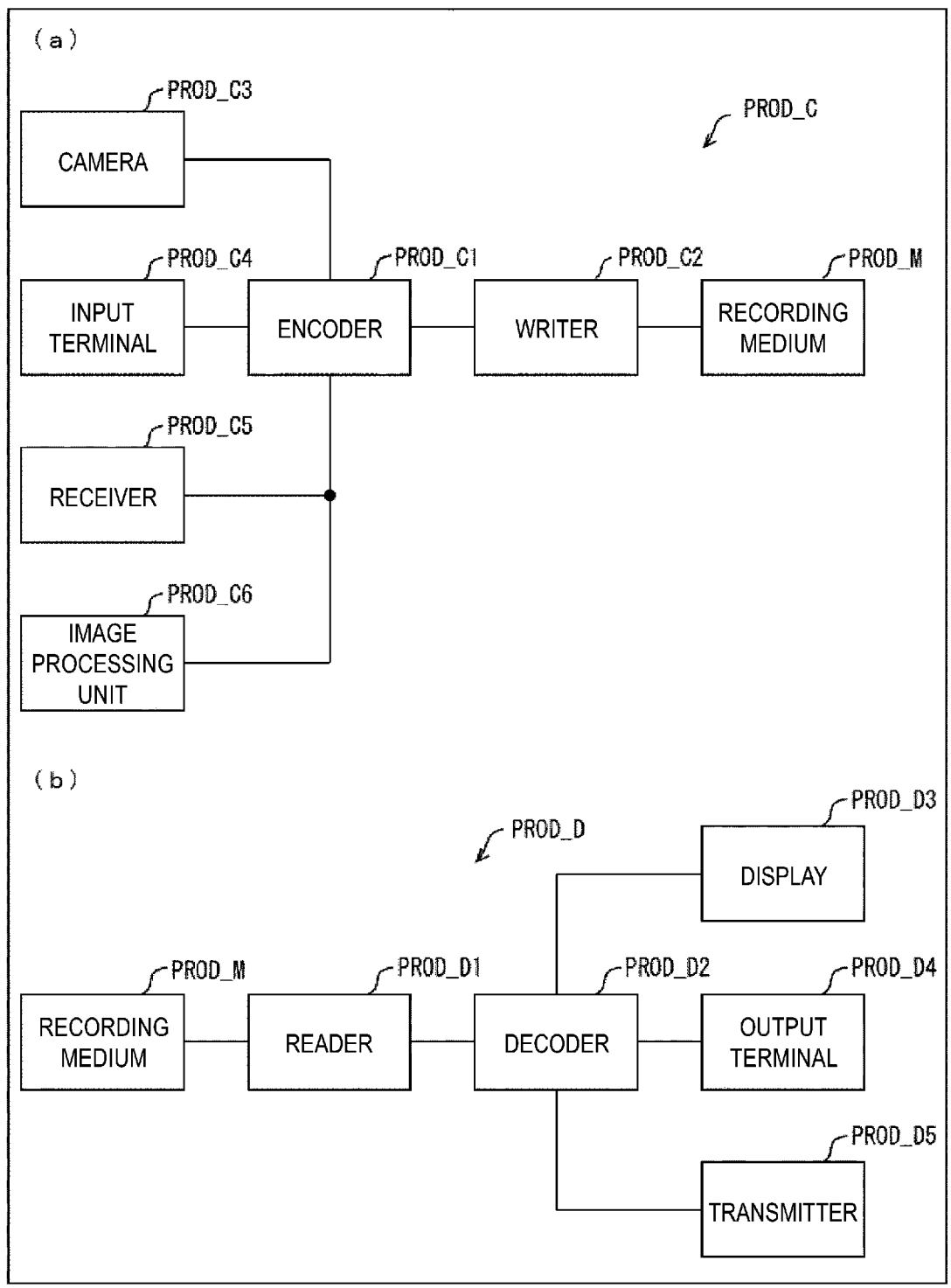
FIG. 13 is a diagram illustrating configurations of a recording apparatus equipped with the video coding apparatus and a reconstruction apparatus equipped with the video decoding apparatus according to the present embodiment. (a) illustrates the recording apparatus equipped with the video coding apparatus, and (b) illustrates the reconstruction apparatus equipped with the video decoding apparatus.

Next, a description is given of that the video coding apparatus 11 and the video decoding apparatus 31 described above can be used to record and reconstruct the video with reference to FIG. 13.

FIG. 13(a) is a block diagram illustrating a configuration of a recording apparatus PROD_C equipped with the video coding apparatus 11 described above. As illustrated in FIG. 13(a), the recording apparatus PROD_C includes an encoder PROD_C1 that obtains coded data by coding a video, and a writer PROD_C2 that writes the coded data obtained by the encoder PROD_C1 in a recording medium PROD_M. The above-mentioned video coding apparatus 11 is utilized as the encoder PROD_C1.

Note that the recording medium PROD_M may be (1) a type of recording medium built in the recording apparatus PROD_C such as Hard Disk Drive (HDD) or Solid State Drive (SSD), may be (2) a type of recording medium connected to the recording apparatus PROD_C such as an SD memory card or a Universal Serial Bus (USB) flash memory, and may be (3) a type of recording medium loaded in a drive apparatus (not illustrated) built in the recording apparatus PROD_C such as Digital Versatile Disc (DVD: trade name) or Blu-ray Disc (BD: trade name).

In addition, the recording apparatus PROD_C may further include a camera PROD_C3 that images a video, an input terminal PROD_C4 for inputting the video from the outside, a receiver PROD_C5 for receiving the video, and an image processing unit PROD_C6 that generates or processes images, as supply sources of the video input into the encoder PROD_C1. Although an example configuration that the recording apparatus PROD_C includes all of the constituents is illustrated in FIG. 13(a), some of the constituents may be omitted.

Note that the receiver PROD_C5 may receive a video which is not coded, or may receive coded data coded in a coding scheme for transmission different from the coding scheme for recording. In the latter case, a decoder for transmission (not illustrated) that decodes coded data coded in the coding scheme for transmission may be present between the receiver PROD_C5 and the encoder PROD_C1.

Examples of such recording apparatus PROD_C include, for example, a DVD recorder, a BD recorder, a Hard Disk Drive (HDD) recorder, and the like (in this case, the input terminal PROD_C4 or the receiver PROD_C5 is the main supply source of videos). In addition, a camcorder (in this case, the camera PROD_C3 is the main supply source of videos), a personal computer (in this case, the receiver PROD_C5 or the image processing unit C6 is the main supply source of videos), a smartphone (in this case, the camera PROD_C3 or the receiver PROD_C5 is the main supply source of videos), or the like is an example of the recording apparatus PROD_C as well.

FIG. 13(b) is a block diagram illustrating a configuration of a reconstruction apparatus PROD_D equipped with the video decoding apparatus 31. As illustrated in FIG. 13(b), the reconstruction apparatus PROD_D includes a reader PROD_D1 which reads coded data written in the recording medium PROD_M, and a decoder PROD_D2 which obtains a video by decoding the coded data read by the reader PROD_D1. The above-mentioned video decoding apparatus 31 is utilized as the decoder PROD_D2.

Note that the recording medium PROD_M may be (1) a type of recording medium built in the reconstruction apparatus PROD_D such as HDD or SSD, may be (2) a type of recording medium connected to the reconstruction apparatus PROD_D such as an SD memory card or a USB flash memory, and may be (3) a type of recording medium loaded in a drive apparatus (not illustrated) built in the reconstruction apparatus PROD_D such as a DVD or a BD.

In addition, the reconstruction apparatus PROD_D may further include a display PROD_D3 that displays a video, an output terminal PROD_D4 for outputting the video to the outside, and a transmitter PROD_D5 that transmits the video, as the supply destinations of the video to be output by the decoder PROD_D2. Although an example configuration that the reconstruction apparatus PROD_D includes all of the constituents is illustrated in FIG. 13(b), some of the constituents may be omitted.

Note that the transmitter PROD_D5 may transmit a video which is not coded or may transmit coded data coded in the coding scheme for transmission different from a coding scheme for recording. In the latter case, an encoder (not illustrated) that codes a video in the coding scheme for transmission may be present between the decoder PROD_D2 and the transmitter PROD_D5.

Examples of the reconstruction apparatus PROD_D include, for example, a DVD player, a BD player, an HDD player, and the like (in this case, the output terminal PROD_D4 to which a television receiver, and the like are connected is the main supply destination of videos). In addition, a television receiver (in this case, the display PROD_D3 is the main supply destination of videos), a digital signage (also referred to as an electronic signboard or an electronic bulletin board, and the like, and the display PROD_D3 or the transmitter PROD_D5 is the main supply destination of videos), a desktop PC (in this case, the output terminal PROD_D4 or the transmitter PROD_D5 is the main supply destination of videos), a laptop or tablet PC (in this case, the display PROD_D3 or the transmitter PROD_D5 is the main supply destination of videos), a smartphone (in this case, the display PROD_D3 or the transmitter PROD_D5 is the main supply destination of videos), or the like is an example of the reconstruction apparatus PROD_D.

Realization by Hardware and Realization by Software

Each block of the above-mentioned video decoding apparatus 31 and the video coding apparatus 11 may be realized as hardware by a logical circuit formed on an integrated circuit (IC chip), or may be realized as software using a Central Processing Unit (CPU).

In the latter case, each of the above-described apparatuses include a CPU that executes a command of a program to implement each of functions, a Read Only Memory (ROM) that stores the program, a Random Access Memory (RAM) to which the program is loaded, and a storage apparatus (recording medium), such as a memory, that stores the program and various kinds of data. The purpose of the embodiments of the present invention can be achieved by supplying, to each of the apparatuses, the recording medium recording readably the program code (execution form program, intermediate code program, source program) of the control program of each of the apparatuses which is software implementing the above-mentioned functions with a computer, and reading and performing the program code that the computer (or a CPU or a MPU) records in the recording medium.

As the recording medium, for example, tapes including a magnetic tape, a cassette tape and the like, discs including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc (DVD)/CD Recordable (CD-R)/Blu-ray Disc (trade name), cards such as an IC card (including a memory card)/an optical card, semiconductor memories such as a mask ROM/Erasable Programmable Read-Only Memory (EPROM)/Electrically Erasable and Programmable Read-Only Memory (EEPROM: trade name)/a flash ROM, logical circuits such as a Programmable logic device (PLD) and a Field Programmable Gate Array (FPGA), or the like can be used.

In addition, each of the apparatuses is configured to be connectable to a communication network, and the program codes may be supplied through the communication network. The communication network is required to be capable of transmitting the program codes, but is not limited to a particular communication network. For example, the Internet, an intranet, an extranet, a Local Area Network (LAN), an Integrated Services Digital Network (ISDN), a Value-Added Network (VAN), a Community Antenna television/Cable Television (CATV) communication network, a Virtual Private Network, a telephone network, a mobile communication network, a satellite communication network, and the like are available. In addition, a transmission medium constituting this communication network is also required to be a medium which can transmit a program code, but is not limited to a particular configuration or type of transmission medium. For example, a wired transmission medium such as Institute of Electrical and Electronic Engineers (IEEE) 1394, a USB, a power line carrier, a cable TV line, a telephone line, an Asymmetric Digital Subscriber Line (ADSL) line, and a wireless transmission medium such as infrared ray of Infrared Data Association (IrDA) or a remote control, BlueTooth (trade name), IEEE 802.11 wireless communication, High Data Rate (HDR), Near Field Communication (NFC), Digital Living Network Alliance (DLNA: trade name), a cellular telephone network, a satellite channel, a terrestrial digital broadcast network are available. Note that the embodiments of the present invention can be also realized in the form of computer data signals embedded in a carrier such that the transmission of the program codes is embodied in electronic transmission.

The embodiments of the present invention are not limited to the above-described embodiments, and various modifications are possible within the scope of the claims. That is, an embodiment obtained by combining technical means modified appropriately within the scope defined by claims is included in the technical scope of the present invention as well.

INDUSTRIAL APPLICABILITY

The embodiments of the present invention can be preferably applied to a video decoding apparatus that decodes coded data in which image data is coded, and a video coding apparatus that generates coded data in which image data is coded. The embodiments of the present invention can be preferably applied to a data structure of coded data generated by the video coding apparatus and referred to by the video decoding apparatus.

CROSS-REFERENCE OF RELATED APPLICATION

This application claims the benefit of priority to JP 2018-124640 filed on Jun. 29, 2018, JP 2018-189948 filed on Oct. 5, 2018, and JP 2018-191532 filed on Oct. 10, 2018, which are incorporated herein by reference in their entirety.

REFERENCE SIGNS LIST

11 Video coding apparatus
31 Video decoding apparatus
101, 308 Prediction image generation unit
104 Entropy encoder (encoder)
107, 305 Loop filter
111 Parameter encoder (splitter, reference range information encoder)
301 Entropy decoder (decoder, reference range information decoder)
302 Prediction parameter decoder (splitter)
3020 Header decoder
3021 CT information decoder (CT decoder)

The invention claimed is:

1. A method for decoding an encoded video picture that is divided into a plurality of tiles, the method comprising:
 decoding tile information for the video picture, the tile information indicating a unit of tile size used to encode the video picture, wherein:
  the video picture is split into coding tree units (CTUs) and decoded on a per CTU basis,
  the tile information comprises a tile unit identifier value,
  when the tile unit identifier value is zero, the unit of tile size is determined to be equal to a size of the CTUs, and
  when the tile unit identifier value is not zero, the unit of tile size is derived by using the tile unit identifier and a block unit size;
 determining an upper left position in the video picture of each of a set of the tiles by using the tile information; and
 decoding each of the tiles.

2. The method of claim 1, wherein:
 when the tile unit identifier value is nonzero, the unit of tile size is a multiple of a minimum size of a coding unit (CU), and
 the unit of tile size is set to the value 1 bit-shifted left by log 2 of the minimum size of the CU plus the tile unit identifier value.

3. The method of claim 1, wherein when the tile unit identifier value is nonzero, the unit of tile size is set to the value 1 bit-shifted left by log 2 of the size of the CTUs minus the tile unit identifier value.

4. The method of claim 1, wherein when the tile unit identifier value is nonzero, the unit of tile size is set to the size of the CTUs in pixels bit-shifted right by the tile unit identifier value.

5. The method of claim 1, wherein:
 the unit of tile size is a unit of tile width, and
 the tile information further indicates a unit of tile height.

6. The method of claim 5, wherein the tile information for the video picture further indicates (i) a number of columns of tiles in the video picture and (ii) a number of rows of tiles in the video picture.

7. The method of claim 6, wherein:
 the tile information for the video picture further indicates (i) a width for each tile column in the video picture specified in the unit of tile width and (ii) a height for each tile row in the video picture specified in the unit of tile height, and
 determining the upper left position in the video picture for a particular tile comprises using the unit of tile width, the tile width for each tile to the left of the particular tile, the unit of tile height, and the tile height for each tile above the particular tile.

8. The method of claim 1, wherein the tile information is stored in a picture parameter set header of a coding stream for the video picture.

9. The method of claim 1, wherein the block unit size is identical to the size of the CTUs.

10. The method of claim 1, wherein the block unit size is identical to a minimum size of a coding unit (CU).

11. A non-transitory machine-readable medium storing computer-executable instructions which, when executed by at least one processing unit, cause the at least one processing unit to decode an encoded video picture that is divided into a plurality of tiles by performing operations comprising:
   decoding tile information for the video picture, the tile information indicating a unit of tile size used to encode the video picture, wherein:
      the video picture is split into coding tree units (CTUs) and decoded on a per CTU basis,
      the tile information comprises a tile unit identifier value,
      when the tile unit identifier value is zero, the unit of tile size is determined to be equal to a size of the CTUs, and
      when the tile unit identifier value is not zero, the unit of tile size is derived by using the tile unit identifier and a block unit size;
   determining an upper left position in the video picture of each of a set of the tiles by using the tile information; and
   decoding each of the tiles.

12. The non-transitory machine-readable medium of claim 11, wherein:
   when the tile unit identifier value is nonzero, the unit of tile size is a multiple of a minimum size of a coding unit (CU), and
   the unit of tile size is set to the value 1 bit-shifted left by log 2 of the minimum size of the CU plus the tile unit identifier value.

13. The non-transitory machine-readable medium of claim 11, wherein when the tile unit identifier value is nonzero, the unit of tile size is set to the value 1 bit-shifted left by log 2 of the size of the CTUs minus the tile unit identifier value.

14. The non-transitory machine-readable medium of claim 11, wherein the tile unit identifier value is nonzero, the unit of tile size is set to the size of the CTUs in pixels bit-shifted right by the tile unit identifier value.

15. The non-transitory machine-readable medium of claim 11, wherein:
   the unit of tile size is a unit of tile width, and
   the tile information further indicates a unit of tile height.

16. The non-transitory machine-readable medium of claim 15, wherein:
   the tile information for the video picture further indicates (i) a number of columns of tiles in the video picture, (ii) a number of rows of tiles in the video picture, (iii) a width for each tile column in the video picture specified in the unit of tile width, and (iv) a height for each tile row in the video picture specified in the unit of tile height, and
   determining the upper left position in the video picture for a particular tile comprises using the unit of tile width, the tile width for each tile to the left of the particular tile, the unit of tile height, and the tile height for each tile above the particular tile.

17. The non-transitory machine-readable medium of claim 11, wherein the block unit size is identical to the size of the CTUs.

18. The non-transitory machine-readable medium of claim 11, wherein the block unit size is identical to a minimum size of a coding unit (CU).

* * * * *